(12) United States Patent
Kojima et al.

(10) Patent No.: US 6,233,066 B1
(45) Date of Patent: May 15, 2001

(54) IMAGE PROCESSING APPARATUS, METHOD FOR IMAGE PROCESSING, AND IMAGE READER APPARATUS

(75) Inventors: Akio Kojima, Neyagawa; Yasuhiro Kuwahara, Osaka; Masao Kataoka, Moriguchi; Teruyuki Naka, Izumi; Atsushi Sogami, Sanda; Toshiaki Koga, Hirakata, all of (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 0 days.

(21) Appl. No.: 09/123,185

(22) Filed: Jul. 27, 1998

(30) Foreign Application Priority Data

Aug. 6, 1997 (JP) .................................. 9-225869

(51) Int. Cl.$^7$ ...................................................... H04N 1/04
(52) U.S. Cl. .......................................... 358/488; 358/404
(58) Field of Search .................................. 358/404, 488, 358/462; 382/169

(56) References Cited

U.S. PATENT DOCUMENTS 5,720,021 * 2/1998 Murata et al. ........................ 395/138
5,949,921 * 9/1999 Kojima et al. ........................ 382/295

FOREIGN PATENT DOCUMENTS

| 03201774 | 9/1991 | (JP) | ................. H04N/1/40 |
| 04107054 | 4/1992 | (JP) | ................. H04N/1/04 |
| 05022518 | 1/1993 | (JP) | ................. H04N/1/04 |
| 05056251 | 3/1993 | (JP) | ................. H04N/1/387 |
| 06181517 | 6/1994 | (JP) | ................. H04N/1/387 |
| 08107479 | 4/1996 | (JP) | ................. H04N/1/04 |
| 4111641133A * | 6/1999 | (JP) | ................. H04N/1/38 |

* cited by examiner

Primary Examiner—Jerome Grant, II
(74) Attorney, Agent, or Firm—Akin, Gump, Strauss, Hauer & Feld, L.L.P.

(57) ABSTRACT

In an image processing apparatus and an image reading apparatus in accordance with the present invention, a density difference detection circuit 9 detects the density differences between input image data 400 and storage data 64 stored in an image memory 6 at an overlapping scanning area read by overlap scanning, a density correction circuit 9 corrects the gray levels of the input image data 400 on the basis of the detected density differences, and a mapping circuit 5 stores correction data 910 in the image memory 6.

37 Claims, 28 Drawing Sheets

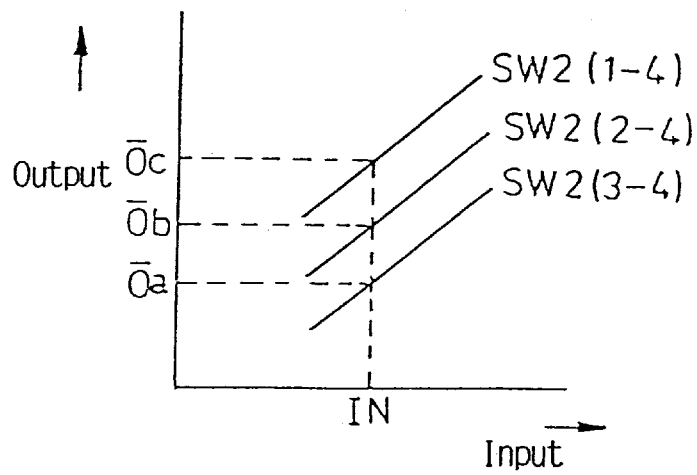
FIG. 27
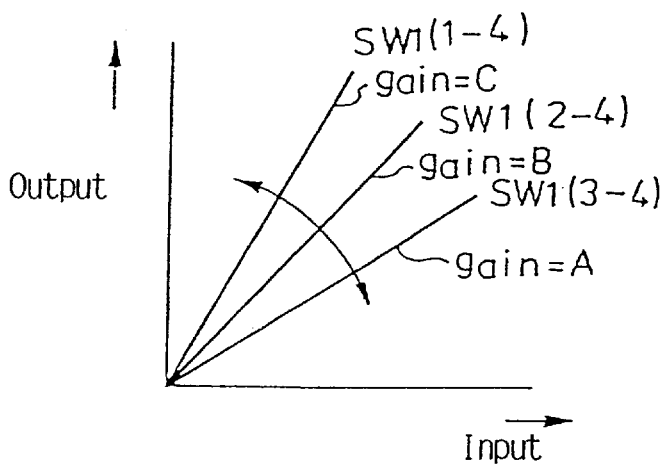
FIG. 28
FIG. 29
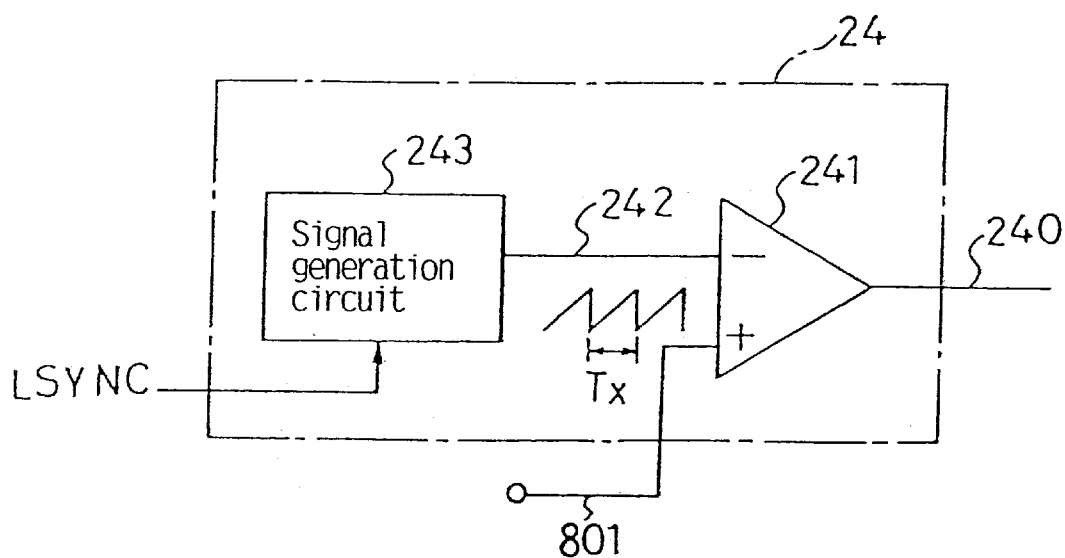

IMAGE PROCESSING APPARATUS, METHOD FOR IMAGE PROCESSING, AND IMAGE READER APPARATUS

TITLE OF THE INVENTION

Image processing apparatus, image processing method and image reading apparatus

BACKGROUND OF THE INVENTION

The present invention relates to an image processing apparatus and an image processing method which store image data obtained by reading an original image by manual operation in an image memory on the basis of reading position data corresponding to the obtained image data. More particularly, the present invention relates to an image processing apparatus, an image processing method and its image reading apparatus each having a function capable of reading gray-scale image data, and its image reading apparatus.

In a conventional image reading apparatus, when an original image larger than the size of the image reading portion of a scanner is read, the apparatus has been configured such that the image is scanned a plurality of times on the original image by manually moving the scanner so that a plurality of divided images can be input. Therefore, in the conventional image reading apparatus, the plural pieces of divided image data are combined to obtain a single piece of image data, and the data is stored. The method disclosed in Japanese Laid-open Patent Application No. (Tokkai Hei) 2-159678, for example, has been known as a method of combining divided image data.

In the conventional combining method disclosed in Japanese Laid-open Patent Application No. 2-159678, a plural pieces of image data having been input dividedly are stored in an image memory. In this combining method disclosed in this Patent Application, by indicating the data in the image memory, displacements at the connection of images are confirmed, and joint end portions are designated to combine the images.

In the combining method of the conventional image reading apparatus, by combining images as described above, a composite image having few dislocation of connection is obtained in fine line pattern of characters, figures and the like.

However, in the scanner of the conventional image reading apparatus for connecting and combining images, in addition to eliminating pattern dislocations in characters, figures and the like, in case of reading by scanning a half-tone image, such as a photo image, it is necessary to prevent the generation of gray-level shifts in the image.

FIG. 33 is a view illustrating a change in gray level in the conventional image reading apparatus. The curve shown in FIG. 33 indicates a change in an image signal 100 used as an output signal obtained when an image on an original having a constant density is read at a plurality of sampling points. In other words, the curve indicates a change in gray-level data. As shown in FIG. 33, in the conventional image reading apparatus, the amount of light reflected from the original is changed by the inclination of the scanner caused during scanning. Consequently, gray-level data is changed even when the image on the original having the constant gray level is read. Since it is very difficult to maintain the inclination of the scanner at a constant angle during a manual operation in particular, gray-level data is therefore changed though in a gradual manner.

FIG. 34 is a view illustrating a method of creating a composite image C by combining images A and B having already been read. The images A and B are input by a line sensor. Even when the images are not read uniformly, gray-level differences occur at the connection portion of the composite image in the same way. When the images A and B having such gray-level differences are combined, reading positions cannot be detected accurately. Therefore, it is difficult to determine positions, on the basis of which composition is carried out.

For these reasons, in the conventional scanner, dislocations and gray-level differences are generated at the connection portion of the composite image, whereby the quality of the image is impaired significantly.

SUMMARY OF THE INVENTION

In order to solve the above-mentioned problems, the present invention is intended to provide an image processing apparatus, an image processing method and an image reading apparatus thereby capable of preventing the generation of density differences at the connection portion of an image even if the change of gray-level arises at a scanning time for reading, and thereby capable of producing a connected composite image having high quality.

In order to attain the above-mentioned object, the image processing apparatus in accordance with the present invention comprises:

an input means for reading image data;

an image memory which is sequentially supplied with reading position data corresponding to the image data having been read and stores the image data on the basis of the reading position data;

a density difference detection means for sequentially detecting the density differences between the image data and storage data stored in the image memory at an overlapping area read by overlap scanning;

a density correction means for correcting the gray-level values of the image data on the basis of the density differences; and a data storage means for performing control to store the corrected image data in the image memory.

Therefore, the image processing apparatus of the present invention can accurately read density images having improved image quality.

Furthermore, in the image processing apparatus in accordance with the present invention, the density difference detection means detects the differences between the ground density of the image data in the read source image and the ground gray levels of the storage data stored in the image memory as density differences at an overlapping scanning area read by overlap scanning.

Therefore, the image processing apparatus of the present invention can accurately detect density joining at the ground density portion for image connection on a text original wherein high accuracy is required.

Furthermore, in the image processing apparatus in accordance with the present invention, the density difference detection means detects the density differences between the image data and the storage data stored in the image memory as density differences at an overlapping scanning area read by overlap scanning.

Therefore, the image processing apparatus of the present invention can accurately detect density differences at an image connection portion of a photo original wherein high accuracy is required.

Furthermore, in the image processing apparatus in accordance with the present invention, the density correction means is configured so that the average of the detected density differences is used as a correction amount and is added to or subtracted from the image data.

Therefore, in the image processing apparatus of the present invention, the average of the obtained density differences is used as the correction amount and is added to or subtracted from the image data, whereby an effect due to improper detection of density differences can be reduced.

Furthermore, in the image processing apparatus in accordance with the present invention, the density difference detection means is configured to detect density differences in units of reading scanning line.

Therefore, in the image processing apparatus of the present invention, density differences are detected in units of reading scanning line, whereby hardware can be made smaller, and cost can be reduced. Moreover, since the image processing apparatus of the present invention can carry out sequential correction for the input image, the density differences at the connection portion of the image can be sequentially corrected by preventing the generation of uneven gray levels, whereby image composition can be carried out accurately.

Furthermore, the image processing apparatus in accordance with the present invention further comprises a first abnormality detection means which judges whether density differences are abnormal or not by comparing the density differences with a predetermined judgment value.

Therefore, the image processing apparatus of the present invention can prevent image deterioration due to the inclination or the like of the main body of a hand-held scanner caused unintentionally by an operator.

Furthermore, in the image processing apparatus in accordance with the present invention, the data storage means is configured to control the storage of the image data in the image memory so that when the first abnormality detection means judges that density differences are abnormal, the image data is prohibited to be stored in the image memory.

Therefore, the image processing apparatus of the present invention can prevent image deterioration due to the inclination or the like of the main body of the hand-held scanner caused unintentionally by the operator.

Furthermore, the image processing apparatus in accordance with the present invention has a means for notifying the operator of abnormality when the first abnormality detection means judges that density differences are abnormal.

Therefore, in the image processing apparatus of the present invention, the operator can immediately recognize the generation of the abnormality.

Furthermore, the image processing apparatus in accordance with the present invention comprises:

an input means for reading image data;

an image memory which is sequentially supplied with the image data having been read and reading position data corresponding to the image data and stores the image data on the basis of the reading position data;

a setting means for setting different processing modes depending on the content of the image data having been read;

an overlapping scanning area detection means for detecting an overlapping area read by overlap scanning;

a density difference detection means for sequentially detecting the density differences between the image data and storage data stored in the image memory at an overlapping scanning area by using at least two detection processes and for detecting density differences being different depending on the processing mode having been set;

a gray-level value correction means for correcting the gray-level values of the image data on the basis of the detected gray-level differences; and a data storage means for storing the image data corrected in a designated processing mode in the image memory.

Therefore, the image processing apparatus of the present invention can detect the density difference best suited for each of different images to be scanned, that is, text, photo and the like, whereby the quality of a connected composite image can be improved. Consequently, when images having different characteristics are read to obtain a connected composite gray-scale image, the image processing apparatus can read the image having improved quality.

Furthermore, the image processing apparatus in accordance with the present invention further comprises a scanning area storing means for sequentially storing the storage position information of the image data to be supplied to the image memory in a scanning information memory, and an overlapping area detection means for detecting an overlapping scanning area read by overlap scanning by detecting the storage position information in the scanning information memory.

Therefore, the image processing apparatus of the present invention can securely detect the overlapping scanning area read by overlap scanning.

Furthermore, the image processing apparatus in accordance with the present invention is configured so that the reading position data can be detected by two position detection means.

Therefore, the image processing apparatus of the present invention can carry out both linear and rotary scanning operations to connect and combine gray-scale images.

Furthermore, the image processing apparatus in accordance with the present invention has a position detection means comprising wheels rotating in contact with the surface of an original and encoders delivering pulses in accordance with the rotations of the wheels.

Therefore, the image processing apparatus of the present invention does not require any auxiliary devices such as a tablet for detecting image coordinates.

Furthermore, the image processing apparatus in accordance with the present invention has a position detection means comprising an encoder delivering two types of pulses having different phases.

Therefore, the image processing apparatus of the present invention can perform scanning in both forward and backward directions. When gray-scale images are connected and combined, reading is made possible by zigzag scanning.

Furthermore, the image processing apparatus in accordance with the present invention comprises:

a light source for illuminating the surface of an original;

an image sensor for reading reflected light from the original;

a position detection means for generating reading position data corresponding to image data having been read by the image sensor;

a density difference detection means for detecting the gray-level differences between the image data and the storage data stored in the image memory at an overlapping scanning area read by overlap scanning;

a light amount correction means for correcting the amount of light of the light source on the basis of the detected density differences; and a data storage means for storing the image data in the image memory on the basis of the generated reading position data, and storing the image data having been read at the corrected amount of light in the image memory on the basis of the reading position data.

Therefore, the image reading apparatus of the present invention has an effect of obtaining a composite image having reduced density differences at the connection portion thereof, whereby it is possible to read precise gray-level images having excellent quality.

Furthermore, the image reading apparatus in accordance with the present invention further comprises a second abnormality detection means for judging that correction is abnormal when the gray-level differences are beyond the correction range of the amount of light by comparing the density differences with a predetermined judgment value.

Therefore, the image reading apparatus of the present invention has an effect of preventing image deterioration due to the inclination or the like of the main body of the hand-held scanner caused unintentionally by the operator.

Furthermore, in the image reading apparatus in accordance with the present invention, the data storage means is configured to control the storage of the image data in the image memory so that the image data is prohibited to be stored in the image memory when the second abnormality detection means judges that the correction is abnormal.

Therefore, the image reading apparatus of the present invention has an effect of preventing image deterioration due to the inclination or the like of the main body of the hand-held scanner caused unintentionally by the operator.

Furthermore, the image reading apparatus in accordance with the present invention has a means for notifying the operator of abnormality when the second abnormality detection means judges that the correction is abnormal.

Therefore, in the image reading apparatus of the present invention, the operator can immediately recognize the generation of the abnormality.

Furthermore, the image reading apparatus in accordance with the present invention comprises:

an image sensor for reading an image on an original;

an A/D conversion means for converting analog data having been read by the image sensor into digital image data in accordance with a reference voltage;

a position detection means for generating reading position data corresponding to the image data;

a density difference detection means for detecting the density differences between the image data and the storage data stored in the image memory at an overlapping scanning area read by overlap scanning;

a reference voltage correction means for correcting the image data by controlling the reference voltage on the basis of the detected density differences;

a data storage means for storing the image data in the image memory on the basis of the reading position data, and storing the image data having been read at the corrected reference voltage in the image memory on the basis of the reading position data.

Therefore, the image reading apparatus of the present invention can obtain a composite image having no density difference at the connection portion thereof, whereby it is possible to read precise gray-scale images having excellent image quality.

Furthermore, the image reading apparatus in accordance with the present invention further comprises a third abnormality detection means for judging that correction is abnormal when the density differences are beyond the correction range of the reference voltage by comparing the density differences with a predetermined judgment value.

Therefore, the image reading apparatus of the present invention has an effect of securely preventing image deterioration due to the inclination or the like of the main body caused unintentionally by the operator.

Furthermore, in the image reading apparatus in accordance with the present invention, the data storage means is configured to control the storage of the image data in the image memory so that the image data is prohibited to be stored in the image memory when a third abnormality detection means judges that the correction is abnormal.

Therefore, the image reading apparatus of the present invention has an effect of securely preventing image deterioration due to the inclination or the like of the main body caused unintentionally by the operator.

Furthermore, the image reading apparatus in accordance with the present invention has a means for notifying the operator of abnormality when the third abnormality detection means judges that the correction is abnormal.

Therefore, in the image reading apparatus of the present invention, the operator can immediately recognize the generation of the abnormality.

Furthermore, the image reading apparatus in accordance with the present invention comprises:

an image sensor for reading an image on an original;

an amplifier means for amplifying analog output having been read by the image sensor;

an A/D conversion means for converting the amplified analog output into digital image data;

a position detection means for generating reading position data corresponding to the image data;

a density difference detection means for detecting the density differences between the image data and the storage data stored in the image memory at an overlapping scanning area read by overlap scanning;

an amplitude control means for controlling the amplitude or offset voltage of the amplifier means on the basis of the detected density differences to correct the analog output;

a data storage means for storing the image data in the image memory on the basis of the reading position data, and storing the image data obtained from the amplitude-controlled analog output in the image memory on the basis of the reading position data.

Therefore, the image reading apparatus of the present invention can obtain a composite image having no density difference at the connection portion thereof, whereby it is possible to read gray-scale images having excellent image quality.

Furthermore, the image reading apparatus in accordance with the present invention further comprises a fourth abnormality detection means for judging that correction is abnormal when the density differences are beyond the correction range of the amplitude control by comparing the density differences with a predetermined judgment value, and a memory control means for controlling the storage of the image data in the image memory.

Therefore, the image reading apparatus of the present invention can securely prevent image deterioration due to the inclination or the like of the main body caused unintentionally by the operator.

Furthermore, the image reading apparatus in accordance with the present invention further comprises a scanning area storing means for sequentially storing the storage position information of the image data to be supplied to the image memory in a scanning information memory, and an overlapping area detection means for detecting an overlapping scanning area read by overlap scanning by detecting the storage position information of the scanning information memory.

Therefore, the image reading apparatus of the present invention can securely detect the overlapping scanning area read by overlap scanning.

Furthermore, the image reading apparatus in accordance with the present invention is configured so that the scanning position data can be detected by two position detection means.

Therefore, the image reading apparatus of the present invention can carry out both linear and rotary scanning operations to connect and combine gray-scale images.

Furthermore, in the image reading apparatus in accordance with the present invention, the position detection means comprises wheels rotating in contact with the surface of an original and encoders delivering pulses in accordance with the rotations of the wheels.

Therefore, the image reading apparatus of the present invention does not require any auxiliary devices such as a tablet for detecting image coordinates.

Furthermore, in the image reading apparatus in accordance with the present invention, the position detection means has an encoder delivering two types of pulses having different phases.

Therefore, the image reading apparatus of the present invention can perform scanning in both forward and backward directions. When gray-scale images are connected and combined, reading can be made by zigzag scanning.

Furthermore, in the image reading apparatus in accordance with the present invention, the memory control means is configured to prohibit the storage of the image data in the image memory when a fourth abnormality detection means judges that the correction is abnormal.

Therefore, the image reading apparatus of the present invention can securely prevent image deterioration due to the inclination or the like of the main body caused unintentionally by the operator.

Furthermore, the image reading apparatus in accordance with the present invention has a means for notifying the operator of abnormality when the fourth abnormality detection means judges that the correction is abnormal.

Therefore, in the image reading apparatus of the present invention, the operator can immediately recognize the generation of the abnormality.

The image processing apparatus in accordance with the present invention comprises:

an input means, driven by manual operation, for reading image data;

an image memory for storing the image data having been read by the input means;

a gray-level difference detection means for sequentially detecting gary-level differences between the image data supplied sequentially and the storage data stored in the image memory at an overlapping area read by overlap scanning;

a density correction means for correcting the gray-level values of the image data on the basis of the detected gray-level differences and correcting sequentially changing gary-level values to reduce the gray-level differences at the overlapping area; and a data storage means for storing the corrected image data in the image memory.

Therefore, the image processing apparatus of the present invention can accurately read gray-scale images having improved quality.

The image processing apparatus in accordance with the present invention comprises:

an input means, driven by manual operation, for separating an image into a plurality of colors and reading the image;

an image memory for storing the image data for colors having been read by the input means;

a color gray-level difference detection means for sequentially detecting the color gray-level differences between the image data for colors supplied sequentially and the storage data for colors stored in the image memory at an overlapping area read by overlap scanning;

a color density correction means for correcting the color gray-level values of the image data for colors on the basis of the detected color gray-level differences and for correcting sequentially changing color gray-level values to reduce the color differences at the overlapping area; and a color data storage means for storing the corrected image data for colors in the image memory.

Therefore, the image processing apparatus of the present invention can accurately combine images by eliminating the color gray-level differences at the connection portion of the image by correcting the color gray-level values of the image data.

In addition, in the image processing apparatus in accordance with the present invention, the image data is data for red, green and blue.

Therefore, the image processing apparatus of the present invention can accurately read color images.

The image processing method in accordance with the present invention comprises:

a step of reading image data by using an input means driven by manual operation;

a step of sequentially supplying reading position data corresponding to the image data having been read;

a step of storing the image data in an image memory on the basis of the reading position data;

a step of sequentially detecting the gray-level differences between the image data having been read and the storage data stored in the image memory at an overlapping area read by overlap scanning;

a step of correcting the gray-level values of the image data on the basis of the detected gray-level differences; and a step of storing the corrected image data in the image memory on the basis of the reading position data.

Therefore, in the image processing method of the present invention, gray-scale images having improved image quality can be read accurately.

The image processing method in accordance with the present invention comprises:

a step of reading image data by using an input means driven by manual operation;

a step of storing the image data having been read in an image memory;

a step of sequentially detecting the gray-level differences between the image data supplied sequentially and the storage data stored in the image memory at an overlapping area read by overlap scanning;

a step of correcting the gray-level values of the image data on the basis of the detected gary-level differences, and correcting the sequentially changing gray-level values in order to reduce the gray-level differences at the overlapping area; and a step of storing the corrected image data in the image memory.

Therefore, in the image processing method of the present invention, images can be combined accurately by eliminating the color gray-level differences at the connection portion of the image by correcting the color gray-level values of the image data.

The image processing method in accordance with the present invention comprises:

- a step of separating an image in a plurality of colors and reading the image by using an input means driven by manual operation;
- a step of storing the image data for colors having been read in the image memory;
- a step of sequentially detecting the gray-level differences between the image data for colors supplied sequentially and the storage data for colors stored in the image memory at an overlapping area read by overlap scanning;
- a step of correcting the color gray-level values of the image data for colors on the basis of the detected gray-level differences, and correcting the sequentially changing color gray-level values in order to reduce the color differences at the overlapping area; and
- a step of storing the corrected image data for colors in the image memory.

Therefore, in the image processing method of the present invention, images can be combined accurately by eliminating the color gray-level differences at the connection portion of the image by correcting the color gray-level values of the image data.

In addition, in the image processing apparatus in accordance with the present invention, the image data for colors is data for red, green and blue.

Therefore, in the image processing method of the present invention, color images can be read accurately.

The image processing method in accordance with the present invention comprises:

- a step of reading image data by using an input means;
- a step of storing the image data having been read in an image memory on the basis of reading position data corresponding to the image data;
- a step of setting a different processing mode depending on the image data having been read;
- a step of detecting an over lapping area read by overlap scanning and of detecting the gray-level differences between the image data and the storage data stored in the image memory at the overlapping area by using at least two detection processes;
- a step of detecting different gray-level differences depending on the processing mode having been set;
- a step of correcting the gray-level values of the image data on the basis of the detected gray-level differences depending on the process mode having been set; and
- a step of storing the corrected image data in the image memory.

Therefore, in the image processing method of the present invention, images can be combined accurately by eliminating the color gray-level differences at the connection portion of the image by correcting the color gray-level values of the image data in an appropriate processing mode.

The novel features of the invention are set forth with particularity in the appended claims. However, both the configurations and contents as well as additional objects and features of the invention will be best understood and evaluated from the following detailed descriptions in connection with the accompanying drawings.

BRIEF DESCRIPTION OF THE DRAWINGS

FIG. 27 is a graph illustrating offset adjustment at the amplifier circuit of the image reading apparatus in accordance with embodiment 6 of the present invention;

FIG. 28 is a graph illustrating gain adjustment at the amplifier circuit of the image reading apparatus in accordance with embodiment 6 of the present invention;

FIG. 29 is a block diagram showing a light amount control circuit of the image reading apparatus in accordance with embodiment 8 of the present invention;

Figure 1:
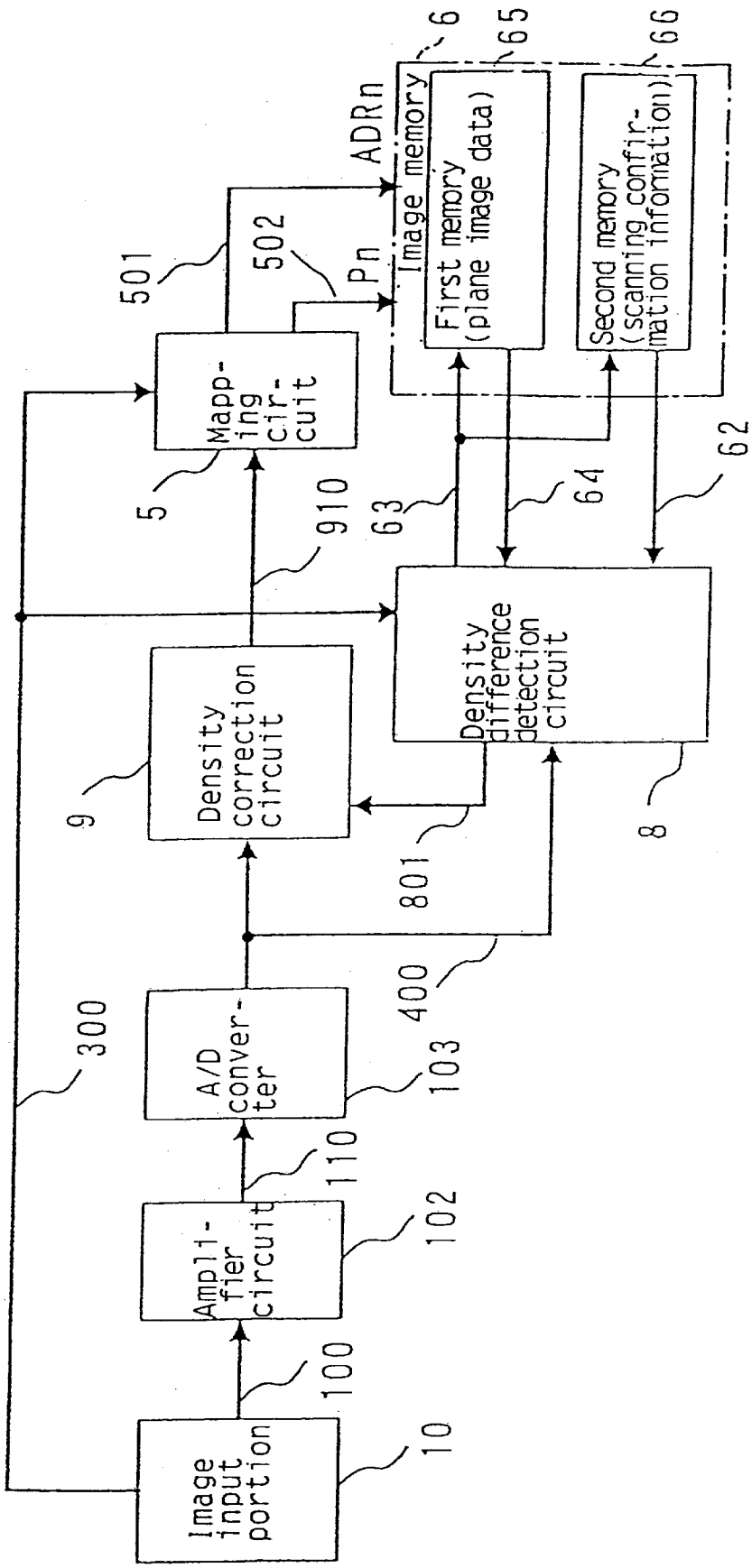
FIG. 1 is a block diagram showing the configuration of an image processing apparatus in accordance with embodiment 1 of the present invention.

It will be recognized that some or all of the drawings are schematic representations for purposes of illustration. It should therefore be noted that components in the drawings are not always faithfully drawn with respect to the actual relative sizes or positions of the components shown.

DETAILED DESCRIPTION OF THE INVENTION

Preferred embodiments 1 to 10, of an image processing apparatus and an image reading apparatus in accordance with the present invention will be described below.

Embodiment 1

FIG. 1 is a block diagram showing the configuration of an image processing apparatus in accordance with embodiment 1 of the present invention. Referring to FIG. 1, an image input portion 10 reads an image on an original by manual operation, and sequentially outputs an image signal 100 to an amplifier circuit 102. The image signal 100 is amplified by the amplifier circuit 102. The amplified signal 110 is sequentially converted from an analog signal to digital image data 400 by an A/D converter 103.

The image data 400 delivered from the A/D converter 103 is supplied to a density difference detection circuit 8 and a density correction circuit 9.

In the image processing apparatus shown in FIG. 1, an image memory 6 comprises a plane image data storage area 65 (hereinafter simplify referred to as a first memory 65) and a scanning confirmation information storage area 66 (hereinafter simplify referred to as a second memory 66).

The density difference detection circuit 8 detects an overlapping reading/scanning area by using a scanning flag 62 stored in the second memory 66. Next, the density difference detection circuit 8 detects density differences on the basis of the image data 400 sequentially supplied in units of one scanning line and storage data 64 having already been stored in the first memory 65 at a previous scanning time, and delivers a density correction signal 801 to the density correction circuit 9.

The density correction circuit 9 corrects the image data 400 in accordance with the correction amount of the density correction signal 801, and delivers correction data 910 to a mapping circuit 5.

The mapping circuit 5 converts scanning position coordinates 300 from the image input portion 10 into a high-density storage address ADRn, and the address is stored at the storage address ADRn (501) of the image memory 6. In addition, the mapping circuit 5 increases the density of the correction data 910 from the density correction circuit 9, and stores the correction data 910 as storage data Pn (502) in the image memory 6.

Configuration of the Image Input Portion

Figure 2:
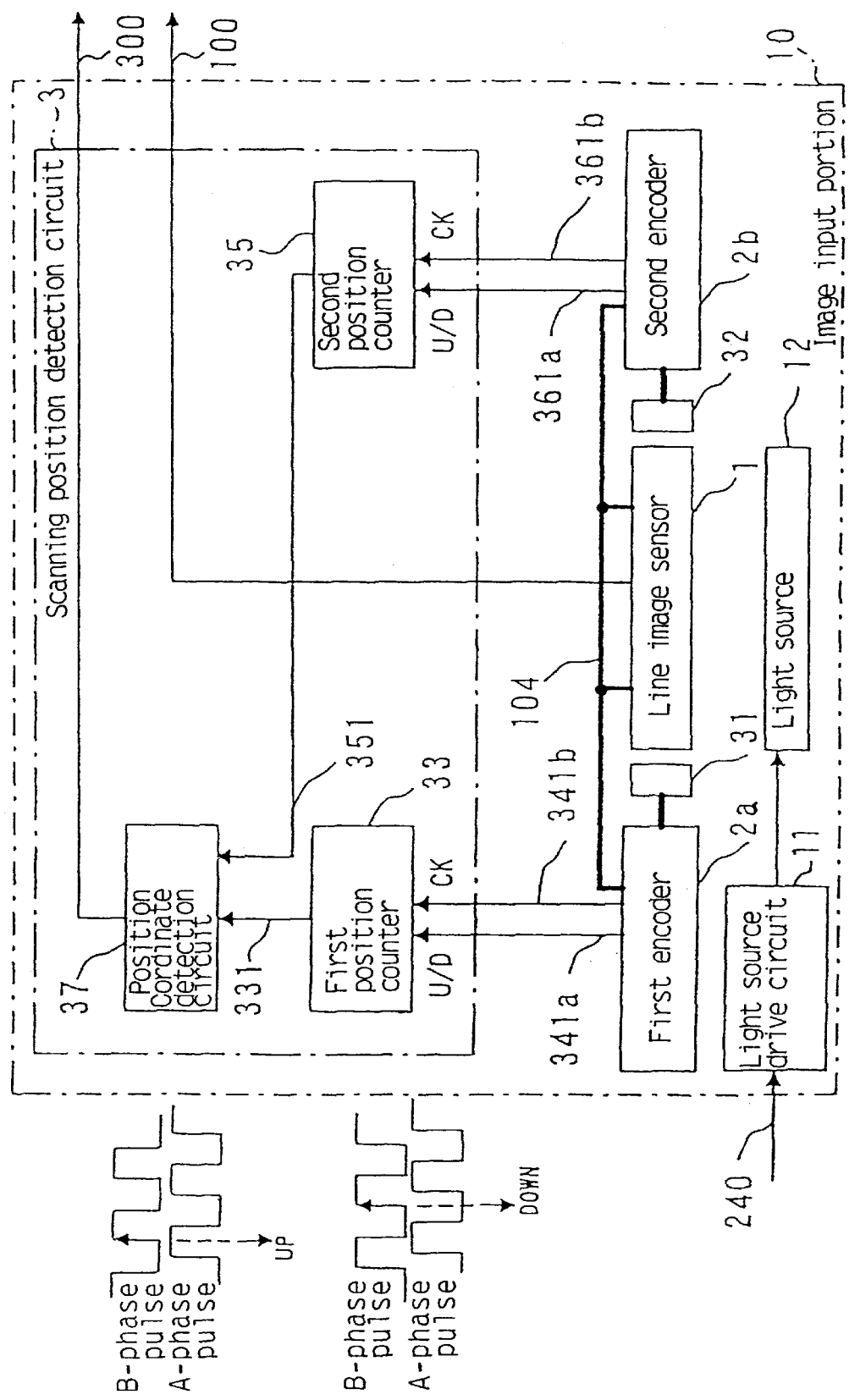
FIG. 2 is a block diagram showing the detailed configuration of the image input portion of the image processing apparatus shown in FIG. 1.

FIG. 2 is a block diagram showing the detailed configuration of the image input portion 10 shown in FIG. 1. Referring to FIG. 2, the numeral 104 designates the housing of a hand-held scanner. The housing 104 is provided with a line image sensor 1, wheels 31, 32 disposed at both ends of the line image sensor 1, a first encoder 2a mounted on the wheel 31, and a second encoder 2b mounted on the wheel 32.

Figure 32:
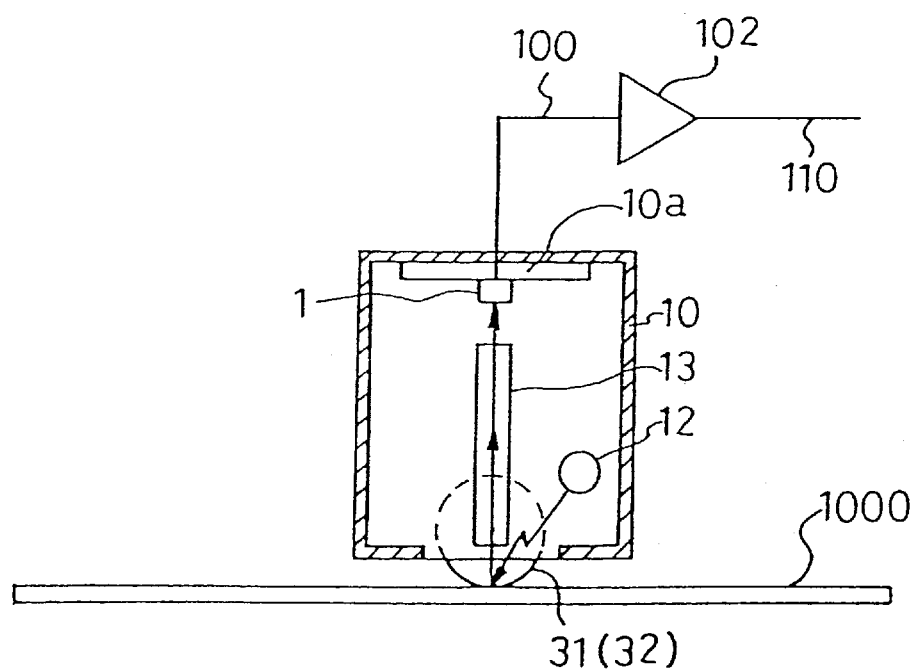
FIG. 32 is a sectional view showing the schematic configuration of the image input portion of the image processing apparatus shown in FIG. 1.
Figure 33:
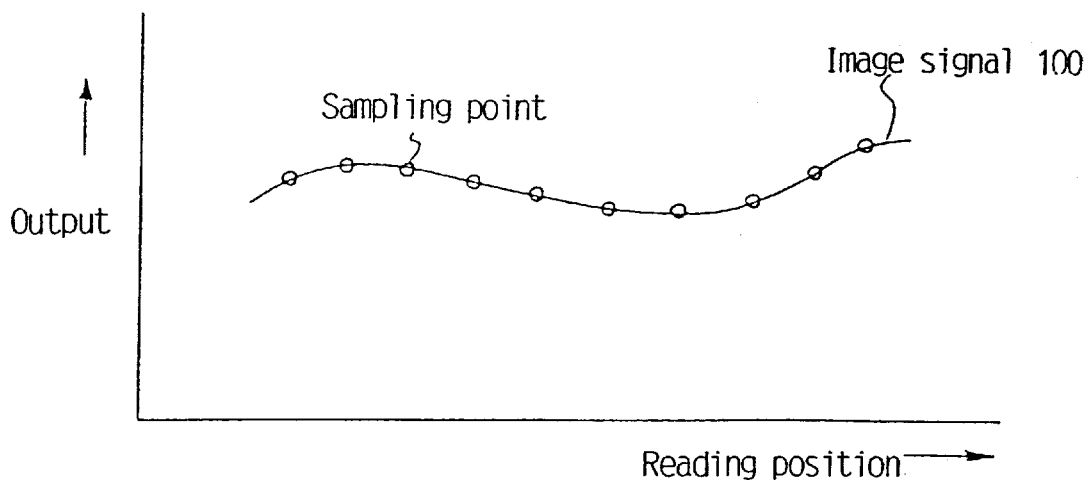
FIG. 33 is a graph illustrating changes in gray level in a conventional reading apparatus.
Figure 34:
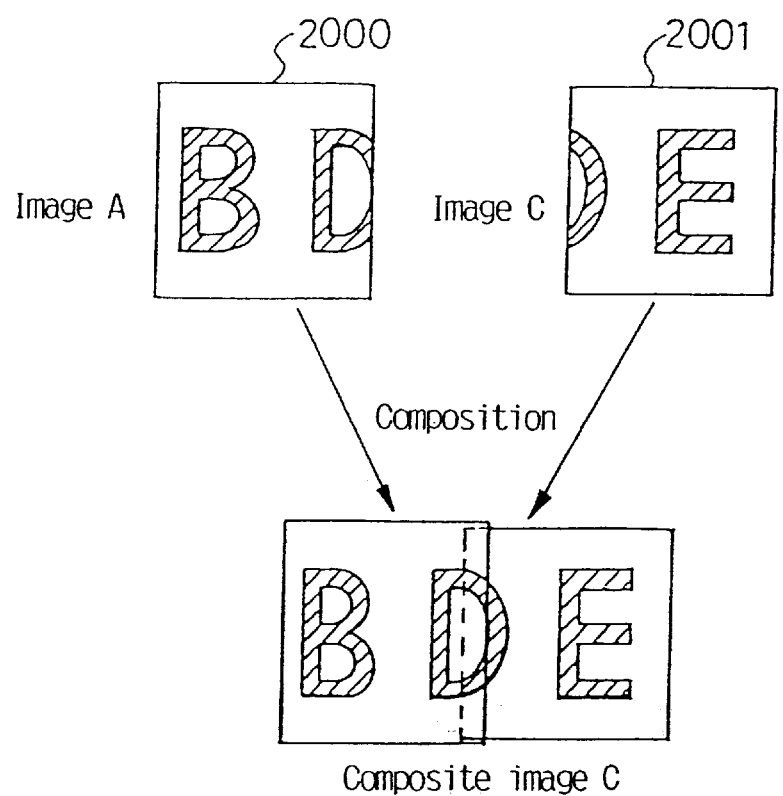
FIG. 34 is a view illustrating a conventional method of combining images.

FIG. 32 is a conceptual view showing the configuration of the image input portion 10. Referring to FIG. 32, light emitted from a light source 12 is cast onto an original 1000. Reflected light from the original 1000 passes through a gradient index lens 13, such as a SELFOC LENS (Registered mark), and an image is formed on the line image sensor 1 disposed on a substrate 10a. The image input portion 10 can read the image on the original 1000 in accordance with the amount of the reflected light from the original 1000. This amount of the reflected light depends on an irradiation angle with respect to the original 1000, and is changed when the irradiation angle is changed.

The output 100 of the line image sensor 1 is supplied to the amplifier circuit 102, and is amplified to become the signal 100. In the case that the line image sensor 1 is a color detection type, it delivers the output 100 separated in a plurality of colors. For example, the output 100 is delivered as a red signal (R), a blue signal (B) or a green signal (G).

The following descriptions will be given returning to FIG. 2. A first position counter 33 detects the movement distance (pulse count value) 331 of the wheel 31 in accordance with pulses 341a, 341b supplied from the first encoder 2a. A second position counter 35 detects the movement distance (pulse count value) 351 of the wheel 32 in accordance with pulses 361a, 361b supplied from the second encoder 2b.

A position coordinate detection circuit 37 detects scanning the position coordinates 300 from the movement distances 331, 351 of the wheels 31, 32, respectively.

As shown in FIG. 2, a scanning position detection circuit 3 comprises the first position counter 33, the second position counter 34 and the coordinate position detection circuit 37.

A light source drive circuit 11 turns on/off the light source 12 comprising an LED array, i. e., a composition of light-emitting diodes.

Configuration of each Circuit in the Image Input Portion

Next, the configuration of each of the above-mentioned circuits will be described below in more detail.

Referring to FIG. 2, the first encoder 2a and the second encoder 2b generate two-phase pulses, that is, A-phase pulses 341a, 361a and B-phase pulses 341b, 361b, in accordance with the rotation angles of the wheels 31, 32, respectively, the A-phase pulses being different from the B-phase pulses in phase by 90 degrees only.

The first position counter 33 and the second position counter 35 use the A-phase pulses 341a, 361a and the B-phase pulses 341b, 361b to detect the rotation directions of the wheels 31, 32, respectively. Since the A-phase pulses 341a, 361a are different from the B-phase pulses 341b, 361b in phase by 90 degrees only, the levels of the A-phase pulses 341a, 361a detected at the rising edges of the B-phase pulses 341b, 361b become level H or L in accordance with the rotation directions of the wheels 31, 32.

When the signals detected from the A-phase pulses 341a, 361a are at level L, it is assumed that the movement direction of the wheels 31, 32 is a forward direction (UP direction). Based on this assumption, when the signals are at level H, the movement direction of the wheels 31, 32 becomes a backward direction (DOWN direction).

When the signals detected from the A-phase pulses 341a, 361a are at level L, the pulse count values of the first position counter 33 and the second position counter 35 are increased in accordance with the numbers of the B-phase pulses. Furthermore, when the signals detected from the A-phase pulses 341a, 361a are at level H, the pulse count values of the first position counter 33 and the second position counter 35 are decreased in accordance with the numbers of the B-phase pulses.

The position coordinate detection circuit 37 receives the pulse count values 331, 351 from the first position counter 33 and the second position counter 35, and calculates the movement distances of the wheels 31, 32 in consideration of the rotation directions of the wheels 31, 32, respectively.

Scanning Position Detection Circuit

Figure 3:
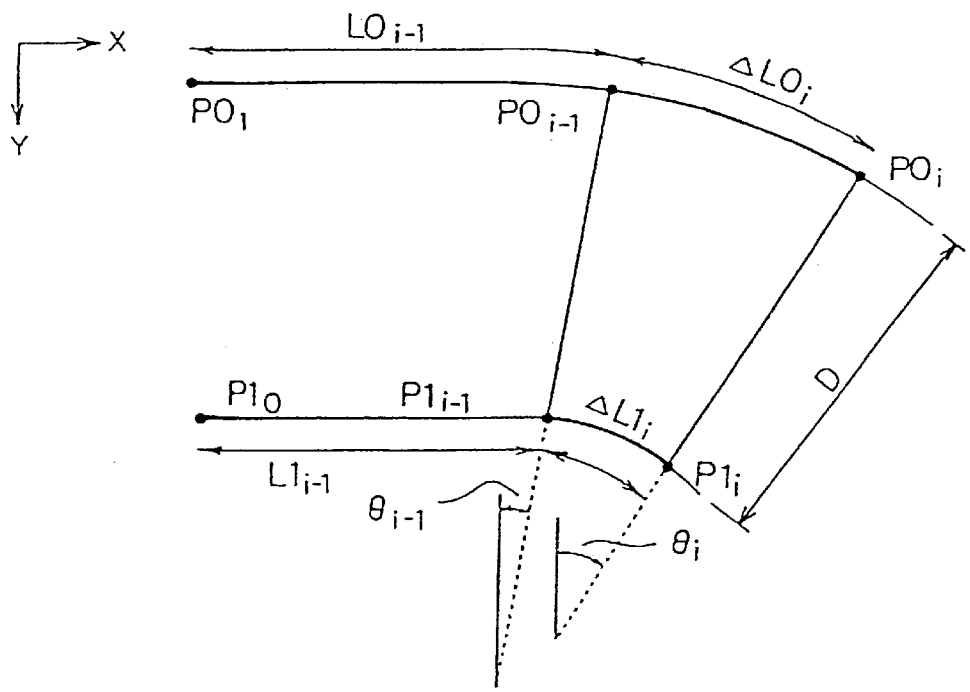
FIG. 3 is a view illustrating the operation of a scanning position detection circuit shown in FIG. 2.

The scanning position detection circuit 3 comprising the first position counter 33, the second position counter 35 and the position coordinate detection circuit 37 shown in FIG. 2 will be described below FIG. 3 is a view illustrating the operation of the scanning position detection circuit 3. Referring to FIG. 3, parallel thick solid lines indicate the movement loci of the two wheels 31, 32. Coordinates indicating the positions of the two wheels 31, 32 at the time when the line image sensor 1 (FIG. 2) reads pixel data in the i-th line are assumed to be $P0_i$ ($X0_i$, $Y0_i$) and $P1_i$ ($X1_i$, $Y1_i$), respectively. If the coordinates of $P0_{i-1}$, $P1_{i-1}$ have already been known, the coordinates of $P0_i$, $P1_i$ can be calculated approximately by using the following formulas (1) to (5).

$$\theta_{i-1} = (L0_{i-1} - L1_{i-1})/D \tag{1}$$

$$X0_i = X0_{i-1} + \Delta L0_i \cdot \cos \theta_{i-1} \tag{2}$$

$$Y0_i = Y0_{i-1} + \Delta L0_i \cdot \sin \theta_{i-1} \tag{3}$$

$$X1_i = X0_i - D \cdot \sin \theta_{i-1} \tag{4}$$

$$Y1_i = Y0_i + D \cdot \cos \theta_{i-1} \tag{5}$$

In the above formulas (1) to (5), represents a multiplication operation, and / represents a division operation. Hereinafter, · represents an operator indicating a multiplication, and / represents an operator indicating a division. In addition, $L0_{i-1}$ represents a distance the wheels 31, 32 have moved during a period from the start of reading to the end of reading in the (i−1)th line. $\Delta L0_i$ represents a distance the wheels 31, 32 have moved during a period from the start of reading in the (i−1)th line to the end of reading in the i-th line. Since the movement distances are determined in consideration of the rotation directions of the wheels 31, 32, the distances may take negative values.

Furthermore, the movement distances of the wheels 31, 32 on the original whose image is to be taken can be obtained by using the numbers of pluses N at the first encoder 2a and the second encoder 2b shown in FIG. 2 and a resolution P per pulse (inch/pulse) and by calculating P×N.

The position coordinate detection circuit 37 reads the pulse count values 331, 351 of the first position counter 33 and the second position counter 35 in synchronization with the reading period of the line image sensor 1, and detects the movement distance $\Delta L0_i$ on the original, including the rotation directions of the wheels 31, 32, on the basis of the difference between the pulse count value in the i-th line and the pulse count value in the (i−1)th line.

D shown in FIG. 3 represents the distance between the wheel 31 and the wheel 32. The above-mentioned formulas (1) to (5) are approximate calculation formulas obtained when it is assumed that $\Delta\theta = |\theta_i - \theta_{i-1}| = |\Delta L0_i - L1_i|/D$ is 0. $\Delta\theta$ represents a change in the angle of the line image sensor 1, which is generated while the line image sensor 1 scans one line. When it is assumed that the coordinates of the two wheels 31, 32 at the start of reading have been determined, the current coordinates of the wheels 31, 32 can be calculated on the basis of the movement distances of the two wheels 31, 32 by using the above-mentioned formulas (1) to (5).

Figure 4:
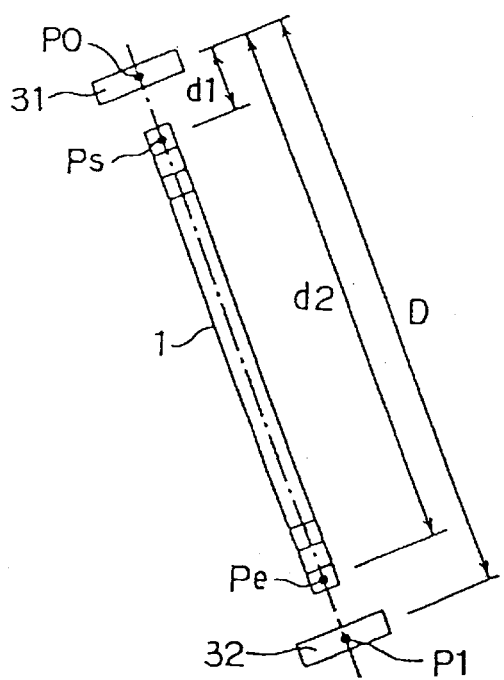
FIG. 4 is a view illustrating a method of calculating the coordinates of the pixels at both ends of a line image sensor 1 shown in FIG. 2.

FIG. 4 is a view used when the coordinates of the pixels to be read at both ends of the line image sensor 1 are calculated.

When it is assumed that the coordinates of the wheel 31 are P0 (X0, Y0), and that the coordinates of the wheel 32 are P1 (X1, Y1), the coordinates Ps (Xs, Ys) and Pe (Xe, Ye) of the pixels at both ends of the line image sensor 1 can be calculated by the following formulas (6) to (9).

$$Xs = X0 + (X1-X0) \cdot d1/D \tag{6}$$

$$Ys = Y0 + (Y1-Y0) \cdot d1/D \tag{7}$$

$$Xe = X0 + (X1-X0) \cdot d2/D \tag{8}$$

$$Ye = Y0 + (Y1-Y0) \cdot d2/D \tag{9}$$

In the formulas (6) to (9), D represents the distance between the wheel 31 and the wheel 32, d1 represents the distance from the wheel 31 to the pixel Ps being nearest from the wheel 31, and d2 represents the distance from the wheel 31 to the pixel Pe being farthest from the wheel 31.

By using the movement distances of the wheels 31, 32 obtained from the two-phase pulses generated by the first encoder 2a and the second encoder 2b, the scanning position detection circuit 3 carries out the calculation operations of the above-mentioned formulas 1 and 2 to obtain the coordinates Ps (Xs, Ys) and Pe (Xe, Ye) of the pixels at both ends of the line image sensor 1. The coordinates Ps (Xs, Ys) and Pe (Xe, Ye) obtained by the calculation are delivered as the scanning position coordinates 300 to the gray-level difference detection circuit 8 and the mapping circuit 5.

Scanning Areas of the Line Image Sensor

Figure 5:
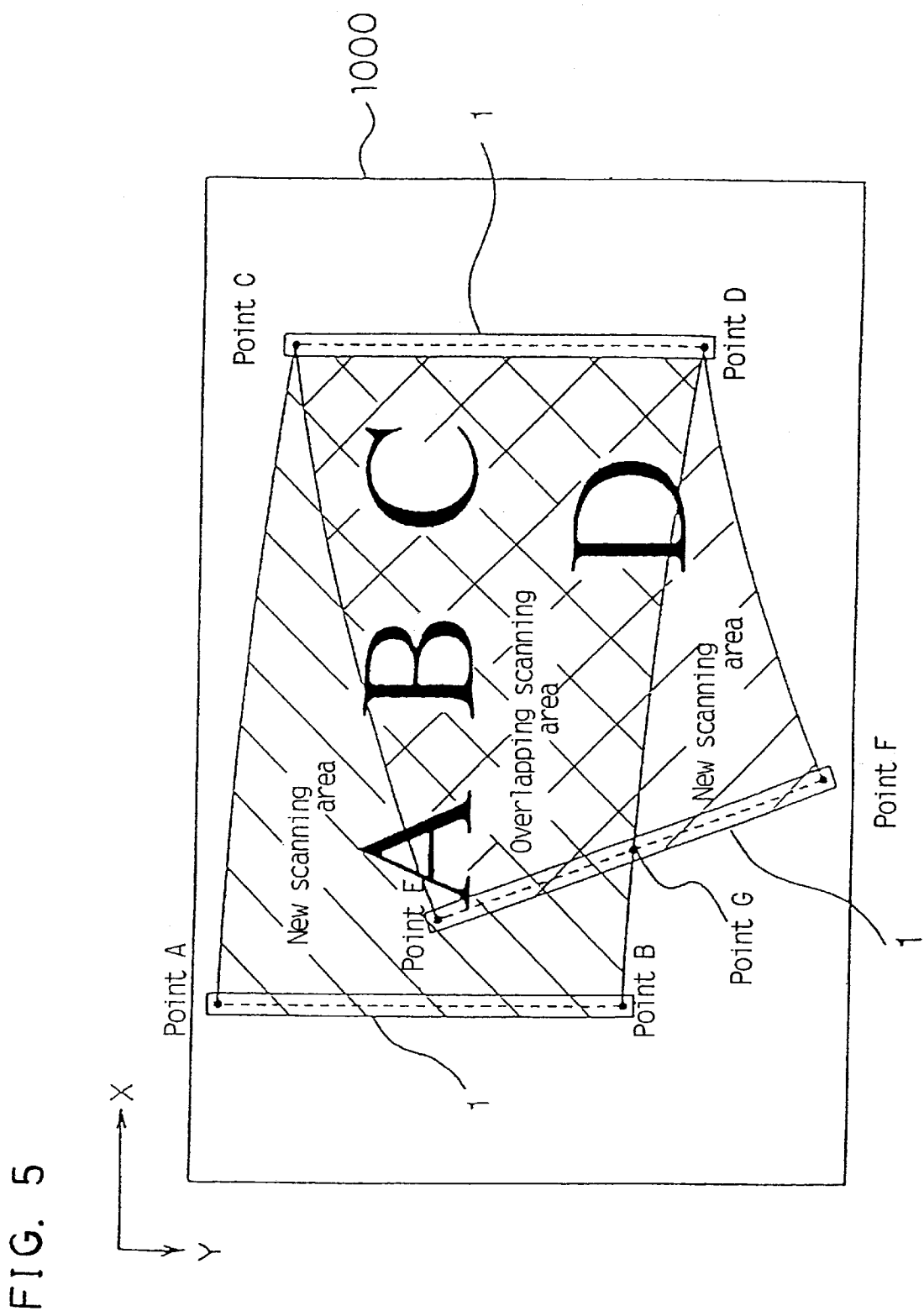
FIG. 5 is a view illustrating the scanning areas of the line image sensor shown in FIG. 2.

Next, scanning areas of the line image sensor 1 will be described below. FIG. 5 is a view illustrating scanning areas of the line image sensor 1. Referring to FIG. 5, the scanning movement of the manually-operated image line sensor 1 will be described below in the case that the width of a reading area of the original 1000 is larger than the length of the line image sensor 1.

To read the original 1000, the operator makes the main body of the hand-held scanner contact with the original 1000, and reciprocates the scanner on the original 1000 to manually scan the original 1000. At this time, the two wheels 31, 32 (not shown in FIG. 5) mounted on the main body of the hand-held scanner rotate, and the two-phase pulses are delivered from the first encoder 2*a* and the second encoder 2*b*. The shaded portions in FIG. 5 represent areas on the original 1000 to be read by the line image sensor 1.

Since the line image sensor 1 cannot scan the entire width of the original 1000 by a single scanning operation, the line image sensor 1 is reciprocated so that the image input portion 10 (FIG. 2) can read the entire area of the original 1000.

Although only the positions of the pixels at both ends of the line image sensor 1 are indicated in FIG. 5, the line image sensor 1 is configured to read an image on the line extending between the pixels at both ends. When the pixels at both ends of the line image sensor 1 are points A and B, for example, the line image sensor 1 reads an image on the line extending between the points A and B (hereinafter referred to as a "reading position A–B").

Referring to FIG. 5, the line image sensor 1 performs scanning from the reading position A–B used as the scanning start position to a reading position C–D. Image data obtained by reading pixels in an area ABDC formed by connecting points A, B, C and D is newly stored in the image memory 6 by the mapping circuit 5 (FIG. 1) on the basis of the scanning position coordinates 300 delivered from the scanning position detection circuit 3 (FIG. 2). This kind of area is hereinafter referred to as a "new scanning area".

Next, the line image sensor 1 is moved in the backward direction to perform scanning from the reading position C–D to a reading position E–F. An area CDGE formed by connecting the points C, D, G and E is an overlapping reading area. This overlapping reading area is hereinafter referred to as an "overlapping scanning area". In addition, the area DGF formed by connecting the points D, G and F is a new scanning area.

By moving the main body of the hand-held scanner to perform scanning as described above, three scanning areas are present, i. e., the overlapping scanning area CDGE, a new scanning area ABGEC and the new scanning area DFG.

If the inclination of the main body of the hand-held scanner for manual scanning is constant when the pixels in the image data are mapped on the basis of the scanning position coordinates 300 from the image input portion 10, there is no change in density in the image data having been read. In other words, even if the image data having been read in the overlapping scanning area CDGE is overwritten in the image memory 6, the image having been read in the image memory 6 has no density difference at the joint portion (connection portion) between the new scanning area ABGEC and the overlapping scanning area CDGE.

In manual operation, however, it is impossible to maintain the inclination of the main body of the hand-held scanner at a constant angle during operation. For this reason, the amount of light reflected by the original is changed depending on a change in the inclination of the main body of the hand-held scanner.

Figure 6:
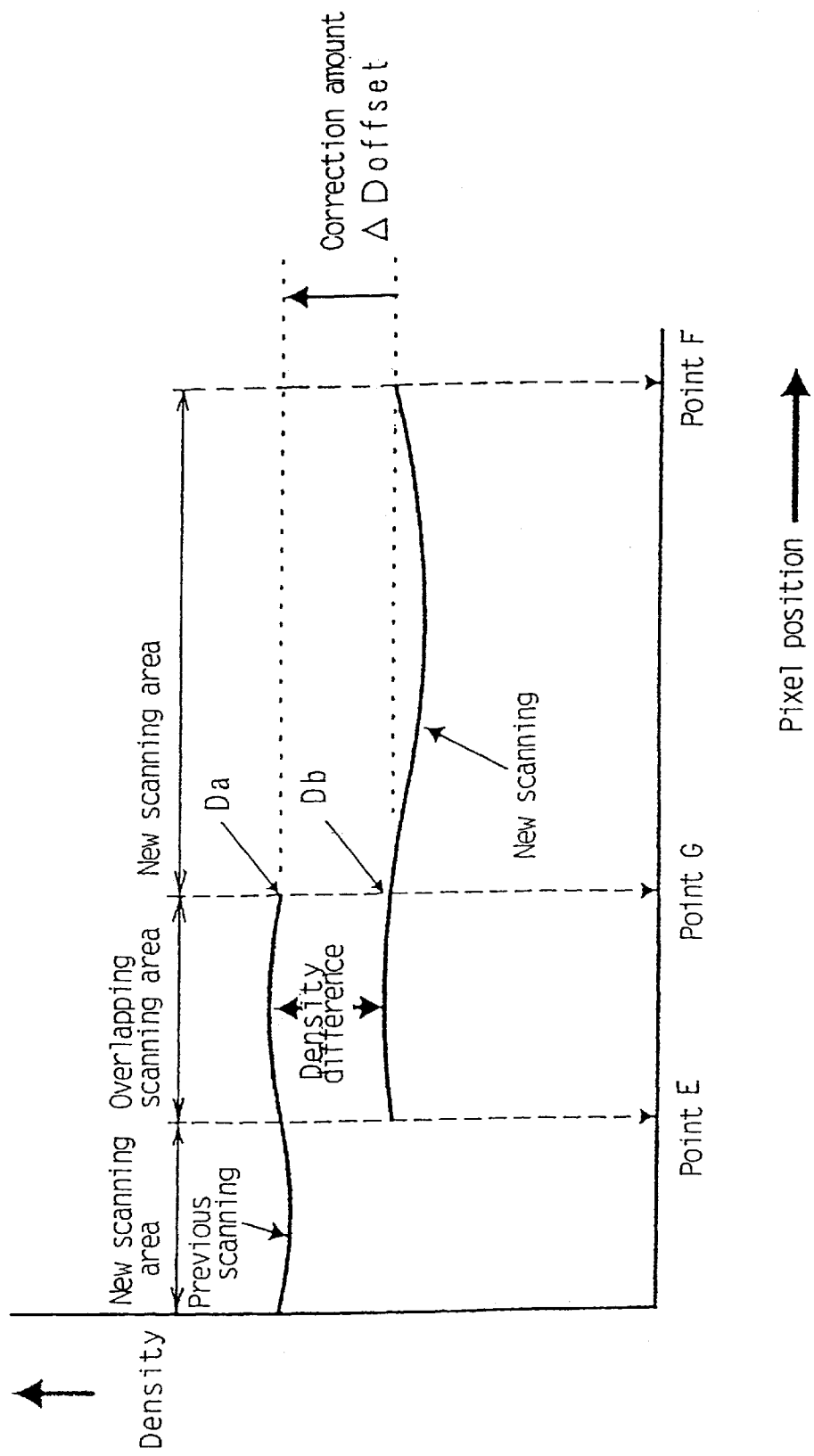
FIG. 6 is a graph illustrating a density correction method in the image processing apparatus shown in FIG. 1.

FIG. 6 is a graph showing a change in density at each pixel position. As shown in FIG. 6, there is a change between the density obtained at the time of previous scanning and the density obtained at the time of new scanning. Therefore, if the image data 400 is directly mapped to the image memory 6 by using the scanning position coordinates 300, density differences will occur at the above-mentioned joint portion (connection portion). "Mapping" is an operation to store the image data having been read at predetermined addresses of the image memory 6.

As shown in FIG. 1, the image processing apparatus of embodiment 1 is provided with the density difference detection circuit 8 to eliminate density differences in images. In the overlapping scanning area CDGE shown in FIG. 5, the density difference detection circuit 8 calculates the density differences between the image data obtained at the time of the previous scanning and stored in the image memory 6 and the image data 400 obtained at the time of the new scanning. The density difference detection circuit 8 produces a density correction signal 801 on the basis of the calculated density differences, and delivers the density correction signal 801 to the density correction circuit 9.

Density difference detection at the density difference detection circuit 8 is carried out line by line to detect density differences in the overlapping scanning area from point E to point G in FIG. 5 on the reading scanning line. The difference value S at point G, generated between the previous scanning and new scanning, is Da–Db, for example. The average of the difference values S at all pixels in the overlapping scanning area on one line is a correction amount ΔDoffset. The density differences can be eliminated by correcting the image data 400 (all pixels from point E to point F) on one line obtained during the new scanning by using the correction amount ΔDoffset obtained from the detected density differences. By correcting the density difference s in this way, it is possible to obtain an excellent composite image having no density difference even at the connection portion (overlapping scanning area).

The density correction circuit 9 corrects the image data 400 by using the correction amount of the density correction signal, ΔDoffset for example, and delivers the correction data 910 to the mapping circuit 5.

Extraction of the overlapping scanning area CDGE caused due to a change in the inclination of the main body of the hand-held scanner will be described later.

In embodiment 1, a density difference is detected on each scanning line and used for density correction. However, a density difference may be detected on a plurality of lines, every four or eight lines for example, so that density differences on more lines can be corrected by a single process.

Data Structure of the Image Memory

Figure 7:
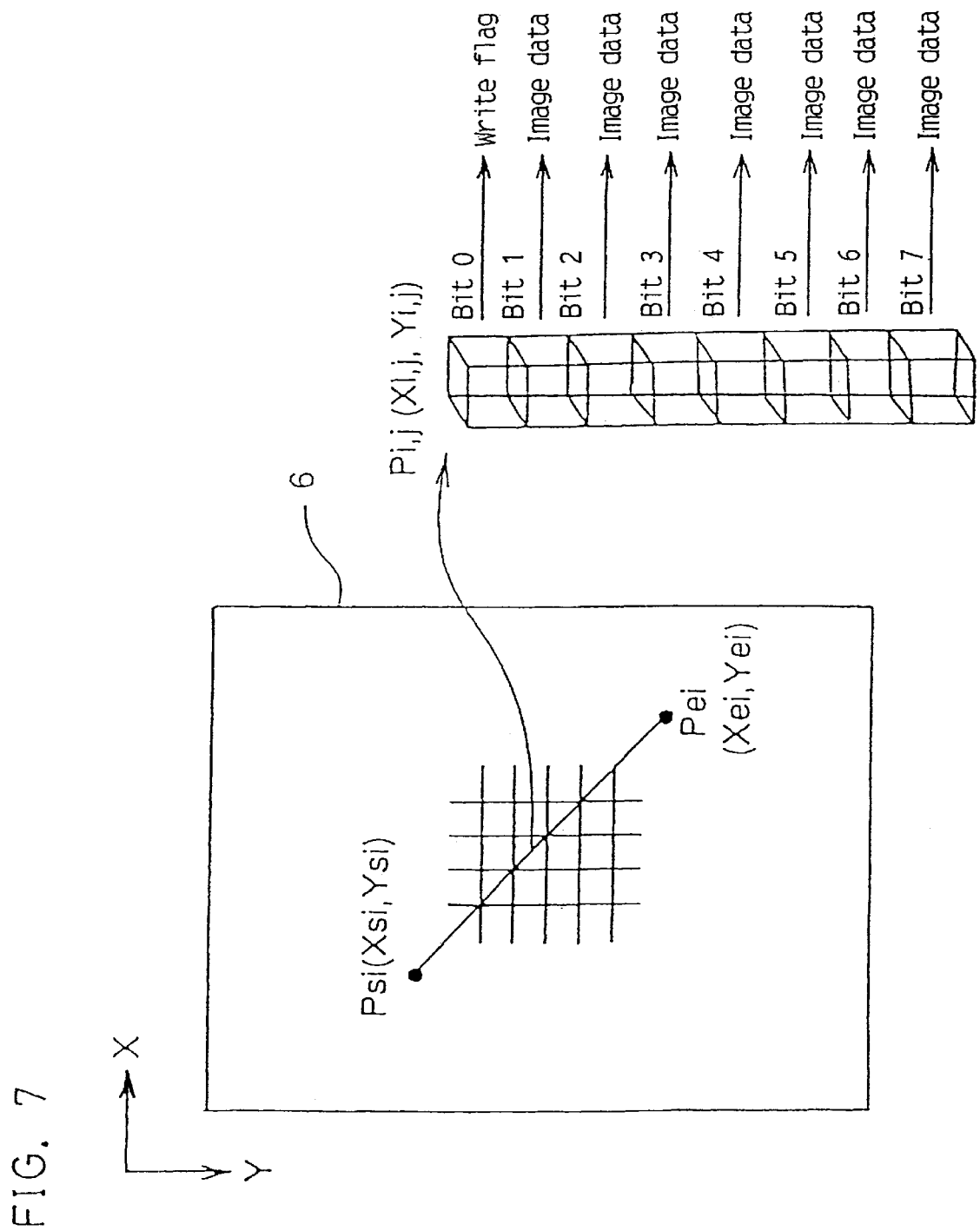
FIG. 7 is a view illustrating the data structure of an image memory shown in FIG. 1.

FIG. 7 is a view illustrating the image memory 6 in accordance with embodiment 1. The bit structure of each pixel of the image memory 6 comprises a write flag storage bit (bit 0) for storing scanning confirmation information and image data storage bits (bits 1 to 7).

In embodiment 1, 7-bit image data with 128 gray levels for example is stored in the image memory 6. The present invention, however, is not limited to this number of gray levels. The number of gray levels should be the number required at the stage of design.

Bit 0 for the write flag is "0" when no image data is written in the image memory 6 (namely, in the case of a nonstorage condition), and "1" when image data has already been written (namely, in the case of a storage condition).

The storage bit (bit 0) for the write flag corresponds to the second memory 66 of the image memory 6 shown in FIG. 1, and the storage bits (bits 1 to 7) for image data correspond to the first memory 65 of the image memory 6.

Density Difference Detection Circuit 8 and Density Correction Circuit 9

Figure 8:
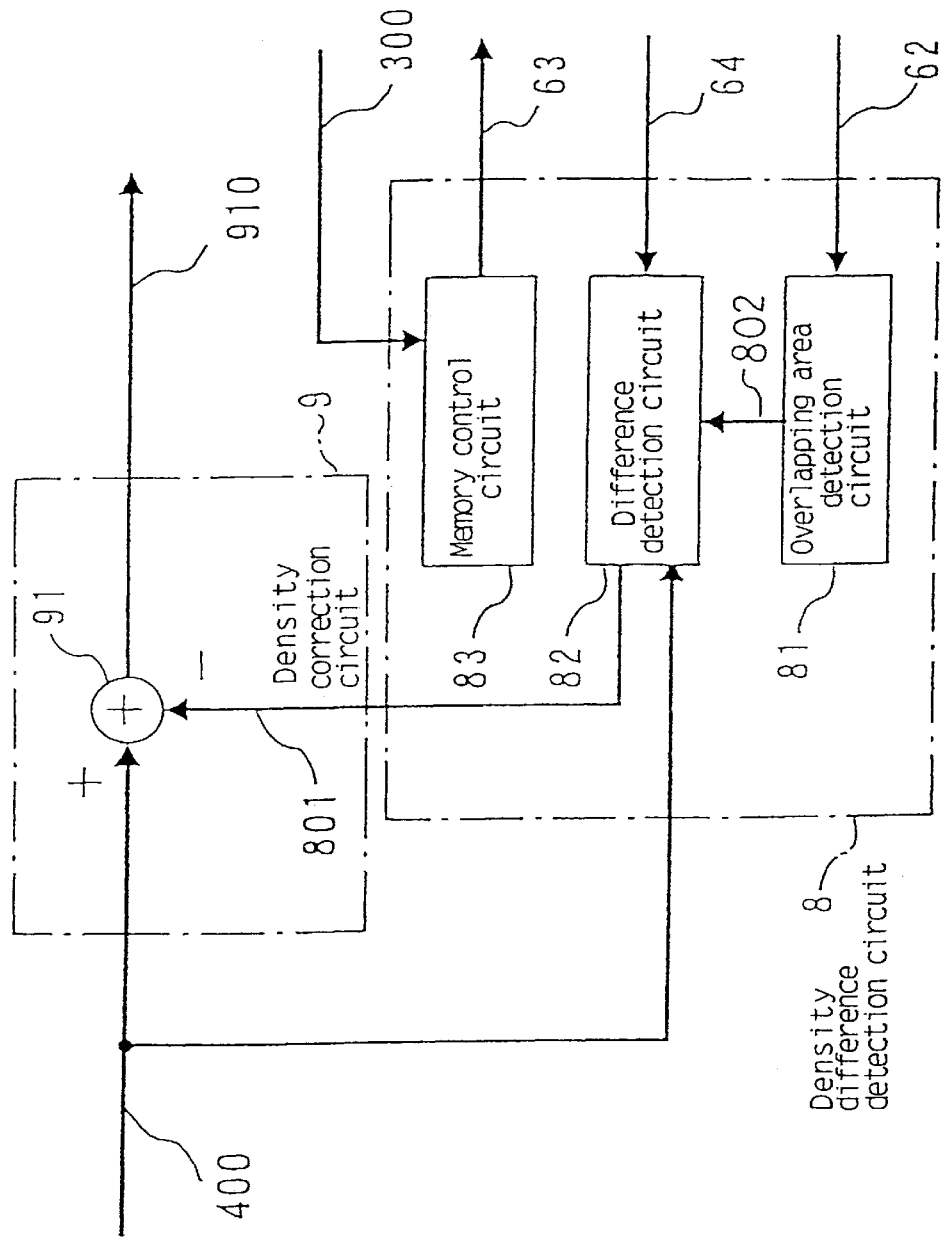
FIG. 8 is a block diagram showing a gray-level difference detection circuit and a density correction circuit shown in FIG. 1.

Next, the operations of the density difference detection circuit 8 and the density correction circuit 9 will be described below referring to FIGS. 1, 2 and 8. FIG. 8 is a block diagram showing the configurations of the density difference detection circuit 8 and the density correction circuit 9.

Before the line image sensor 1 shown in FIG. 2 starts scanning, all of the data in the image memory 6 are initialized to "0". After this initialization, the scanning position coordinates 300 are delivered to the mapping circuit 5 and the density difference detection circuit 8 at the time of line-by-line scanning by the line image sensor 1 (FIG. 1).

As shown in FIG. 8, the density difference detection circuit 8 comprises an overlapping area detection circuit 81, a difference detection circuit 82 and a memory control circuit 83.

The memory control circuit 83 generates the detection address 63 of a pixel Pn for 1-line gray-level detection, and delivers this detection address 63 to the image memory 6. The difference detection circuit 82 reads storage data 64 from the first memory 65 of the image memory 6. At the same time, the overlapping area detection circuit 81 reads a scanning confirmation data 62 corresponding to the storage data 64 from the second memory 66.

The overlapping area detection circuit 81 checks the write flag (bit 0) of the image data Pn from the scanning confirmation data 62 to judge whether image data has already been stored at address ADRn of the pixel data Pn. When the write flag (bit 0) of the pixel data Pn is "1", the flag indicates that image data has already been stored at address ADRn by the scanning of the line image sensor 1. It is thus judged that the pixel data Pn is included in the overlapping scanning area. Furthermore, when the write flag (bit 0) of the pixel data Pn is "0", it is judged that the pixel data Pn is included in the new scanning area. The overlapping area detection circuit 81 having made judgment as described above delivers a judgment signal 802 to the difference detection circuit 82. The judgment signal 802 is "0" when the image data Pn is included in the new scanning area, and "1" when the image data Pn is included in the overlapping scanning area.

The difference detection circuit 82 detects the density differences between the storage data 64 and the image data 400 for pixels having been judged that the judgment signal 802 is "1", and delivers the density correction signal 801.

For all the image data 400 on one line, the density difference detection circuit 8 detects the gray-level differences at only the pixels included in the overlapping scanning area and generates the density correction signal 801.

The density correction circuit 9 carries out a difference process from the density correction signal 801 and the image data 400 by using an adder 91, corrects a change in density between the previous scanning and the new scanning, and delivers the correction data 910.

Operation of the Mapping Circuit

Figure 9:
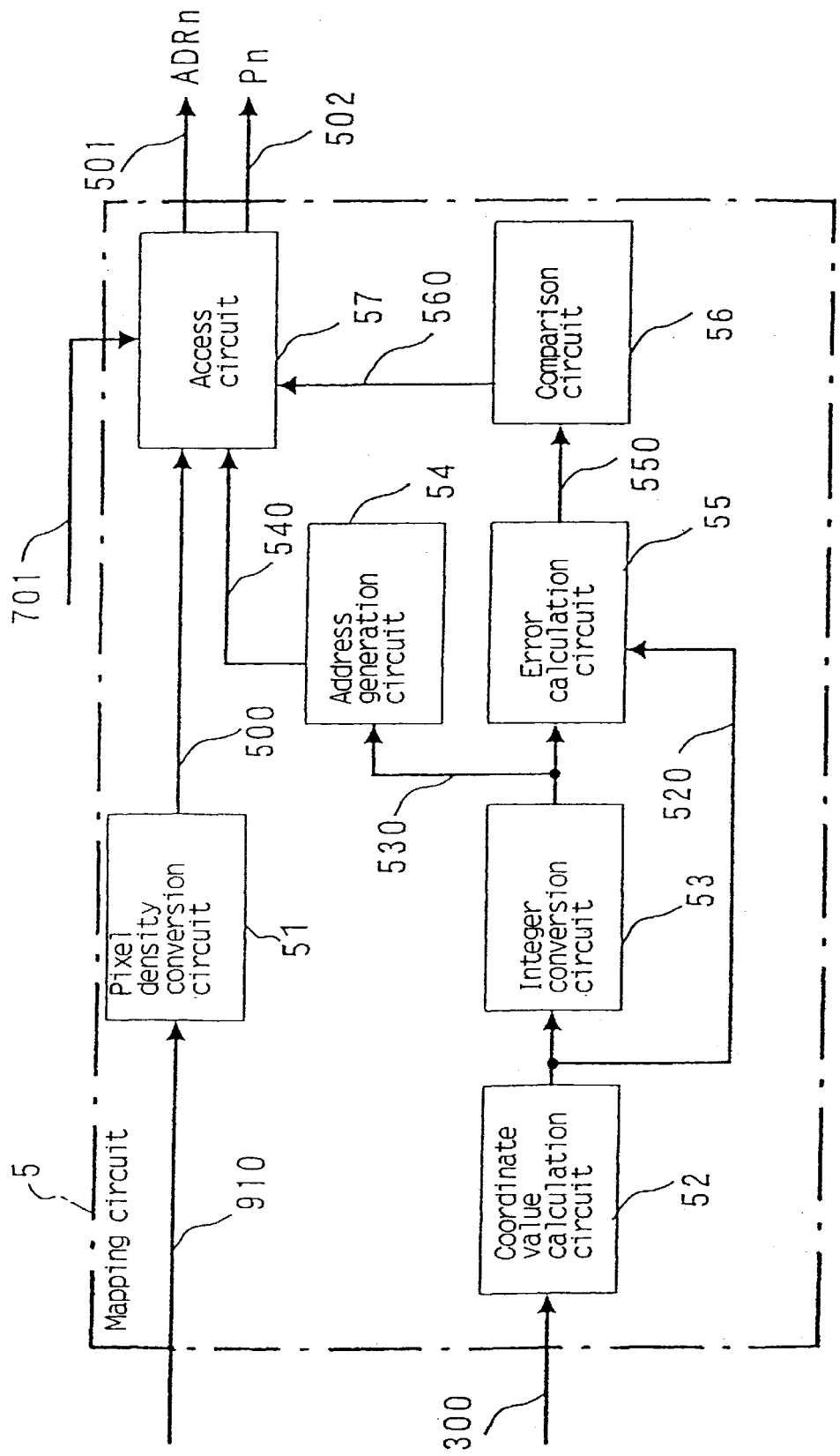
FIG. 9 is a block diagram showing the configuration of a mapping circuit shown in FIG. 1.

Next, the operation of the mapping circuit 5 will be described below referring to FIG. 9. FIG. 9 is a block diagram showing the configuration of the mapping circuit 5 in accordance with embodiment 1.

Referring to FIG. 9, a pixel density conversion circuit 51 generates three interpolation pixels for one of pixel data in the correction data 910 generated by the image data 400 and the density correction signal 801, and delivers high-density image data 500 having a double density.

Since the high-density image data 500 is used in the mapping circuit 5 of embodiment 1, the image processing apparatus of embodiment 1 can reduce mapping errors when storing data in the image memory 6.

Instead of the high-density image data 500, the correction data 910 may be used as storage data to be stored in the image memory 6 in order to detect density differences.

The interpolation pixels formed by the pixel density conversion circuit 51 are generated from four adjacent pixels in the correction data 910. Three pieces of interpolation image data $Q_{i,j}$, $R_{i,j}$ and $S_{i,j}$ for the pixel data Pi,j in the correction data 910 can be calculated by using the following formulas (10), (11) and (12).

$$Q_{i,j}=(P_{i,j}+P_{i,j+1})/2 \tag{10}$$

$$R_{i,j}=(P_{i,j}+P_{i-1,j})/2 \tag{11}$$

$$S_{i,j}=(P_{i,j}+P_{i,j+1}+P_{i-1,j}+P_{i-1,j+1})/4 \tag{12}$$

The scanning position coordinates 300, the coordinate values of the pixels at both ends of the line image sensor 1, are supplied to the coordinate value calculation circuit 52 of the mapping circuit 5 shown in FIG. 9. The coordinate value calculation circuit 52 calculates the coordinate values 520 of each pixel of the high-density image data 500 by using the scanning position coordinates 300 having been supplied.

The operation of the coordinate value calculation circuit 52 will be described below in the case that the coordinates of the pixels Psi, Pei at both ends of the line image sensor 1 are $(Xs_i, Ys_i)$ and $(Xe_i, Ye_i)$, respectively as shown in FIG. 7.

Suffix i in the coordinate values indicates that the values with the suffix are coordinates at the i-th line position of the image data 400. It is herein assumed that the density of the pixels to be read by the line image sensor 1 is eight pixels/mm, and that the density of the pixels of an image to be stored in the image memory 6 is eight pixels/mm. $Xs_i$, $Ys_i$, $Xe_i$ and $Ye_i$ are real numbers in units of ⅛ mm.

When the number of pixels to be read on one line by the line image sensor 1 is Nd, and a pixel number on one line is j, the coordinates $(XP_{i,j}, YP_{i,j})$ of the pixel data $P_{i,j}$ can be calculated by using the following formulas (13) and (14).

$$XP_{i,j}=Xs_i+j\cdot(Xe_i-Xs_i)/(Nd-1) \tag{13}$$

$$YP_{i,j}=Ys_i+j\cdot(Ye_i-Ys_i)/(Nd-1) \tag{14}$$

The coordinates $(XQ_{i,j}, YQ_{i,j})$, $(XR_{i,j}, YR_{i,j})$ and $(XS_{i,j}, YS_{i,j})$ of the three interpolation pixel data $Q_{i,j}$, $R_{i,j}$ and $S_{i,j}$ corresponding to the pixel data $P_{i,j}$ can be calculated by using the following formulas (15) and (20).

$$XQ_{i,j}=(XP_{i,j}+XP_{i,j+1})/2 \tag{15}$$

$$YQ_{i,j}=(YP_{i,j}+YP_{i,j+1})/2 \tag{16}$$

$$XR_{i,j}=(XP_{i,j}+XP_{i-1,j})/2 \tag{17}$$

$$YR_{i,j}=(YP_{i,j}+YP_{i-1,j})/2 \tag{18}$$

$$XS_{i,j}=(XP_{i,j}+XP_{i,j-1}+XP_{i-1,j+XPi-1,j+1})/4 \tag{19}$$

$$YS_{i,j}=(YP_{i,j}+YP_{i,j+1}+YP_{i-1,j}+YP_{i-1,j+1})/4 \tag{20}$$

The coordinate value calculation circuit 52 of the mapping circuit 5 shown in FIG. 9 carries out operations shown in the above-mentioned formulas (13) to (20) in order to calculate the coordinate values 520 of each pixel in the high-density image data 500.

An integer conversion circuit 53 converts the coordinate values 520, real numbers, into integers and delivers integer conversion coordinate values 530. When it is assumed that the coordinate values 520 are (Xreal, Yreal) and that the integer conversion coordinate values 530 are (Xint, Yint), the integer conversion coordinate values can be calculated by using the following formulas (21) and (22).

$$Xint=[Xreal] \qquad (21)$$

$$Yint=[Yreal] \qquad (22)$$

In the formulas (21) and (22), [] indicates an operation for rounding off decimal fractions. Dropping decimal fractions after adding 0.5 is equivalent to rounding off. Therefore, in the present embodiment, decimal fractions are dropped after 0.5 is added.

The address generation circuit 54 of the mapping circuit 5 shown in FIG. 9 converts the integer conversion coordinate values 530 delivered from the integer conversion circuit 53 into the address 540 of the image memory 6.

The image memory 6 is a page memory having an address arrangement comprising M pixels in the X direction and N pixels in the Y direction as shown in FIG. 9. The address of the upper left pixel of the image memory 6 is 0, the address of the upper right pixel is (M−1), and the address of the lower right pixel is (MN−1). When the integer coordinate values 530 are (Xint, Yint), address ADR in the image memory 6 can be calculated by using the following formula (23).

$$ADR=Xint+M\cdot Yint \qquad (23)$$

The error calculation circuit 55 of the mapping circuit 5 shown in FIG. 9 receives the real number coordinate values 520 and the integer conversion coordinate values 530. The error calculation circuit 55 delivers coordinate errors 550, which are generated when the real number coordinate values 520 are converted into integers, to a comparison circuit 56. When a coordinate error in the X direction is Ex, and a coordinate error in the Y direction is Ey, the coordinate errors (Ex, Ey) can be calculated by using the following formulas (24) and (25).

$$Ex=|Xreal-Yint| \qquad (24)$$

$$Ey=|Yreal-Yint| \qquad (25)$$

In the formulas (24) and (25), indicates an operation for obtaining an absolute value. Hereinafter, | | is used as an operator for obtaining an absolute value. Furthermore, in embodiment 1, the coordinate errors Ex and Ey take values between 0 and 0.5.

The comparison circuit 56 of the mapping circuit 5 shown in FIG. 9 compares the coordinate errors Ex, Ey with a predetermined value. To an access circuit 57, the comparison circuit 56 delivers a signal 560 which becomes "1" when both the coordinate errors Ex, Ey are smaller than the above-mentioned predetermined value.

The access circuit 57 is a circuit for making input data take access to the image memory 6. An address in the image memory 6 is designated by the address 540 delivered from the address generation circuit 54 to the access circuit 57. The high-density image data 500 is stored in the image memory 6 by the access circuit 57 only when the judgment signal 802 from the overlapping area detection circuit 81 of the density difference detection circuit 8 is "0" and the signal 560 is "1". In other words, any given pixel in the high-density image data 500 can be mapped to the image memory 6 only when the pixel is included in the new scanning area and when the coordinate errors Ex and Ey are smaller than the above-mentioned predetermined value. Pixels incapable of satisfying the above-mentioned conditions are not mapped to the image memory 6.

Embodiment 1 uses a configuration wherein the judgment signal 802 is used to control data storage in the image memory 6. However, it is possible to use a simple configuration wherein the judgment signal 802 is not used. In this case, the judgment signal 802 is fixed to "0".

As described above, in embodiment 1, the gray-scale image data 400 on the original is read line by line, the scanning position coordinates 300 corresponding to the image data 400 are detected, and the image data 400 is mapped to the image memory 6. During this process, density differences to be generated during scanning are detected on the basis of the gray-scale image data 400 having been read and the data stored in the image memory 6, and the density differences are corrected.

As described above, the image processing apparatus of embodiment 1 can generate a composite image wherein the density differences at the connection portion can be prevented from generating by correcting image data. As a result, the image processing apparatus of embodiment 1 can read gray-scale images having improved image quality.

Embodiment 2

An image processing apparatus in accordance with embodiment 2 of the present invention will be described below referring to the accompanying drawings.

Figure 10:
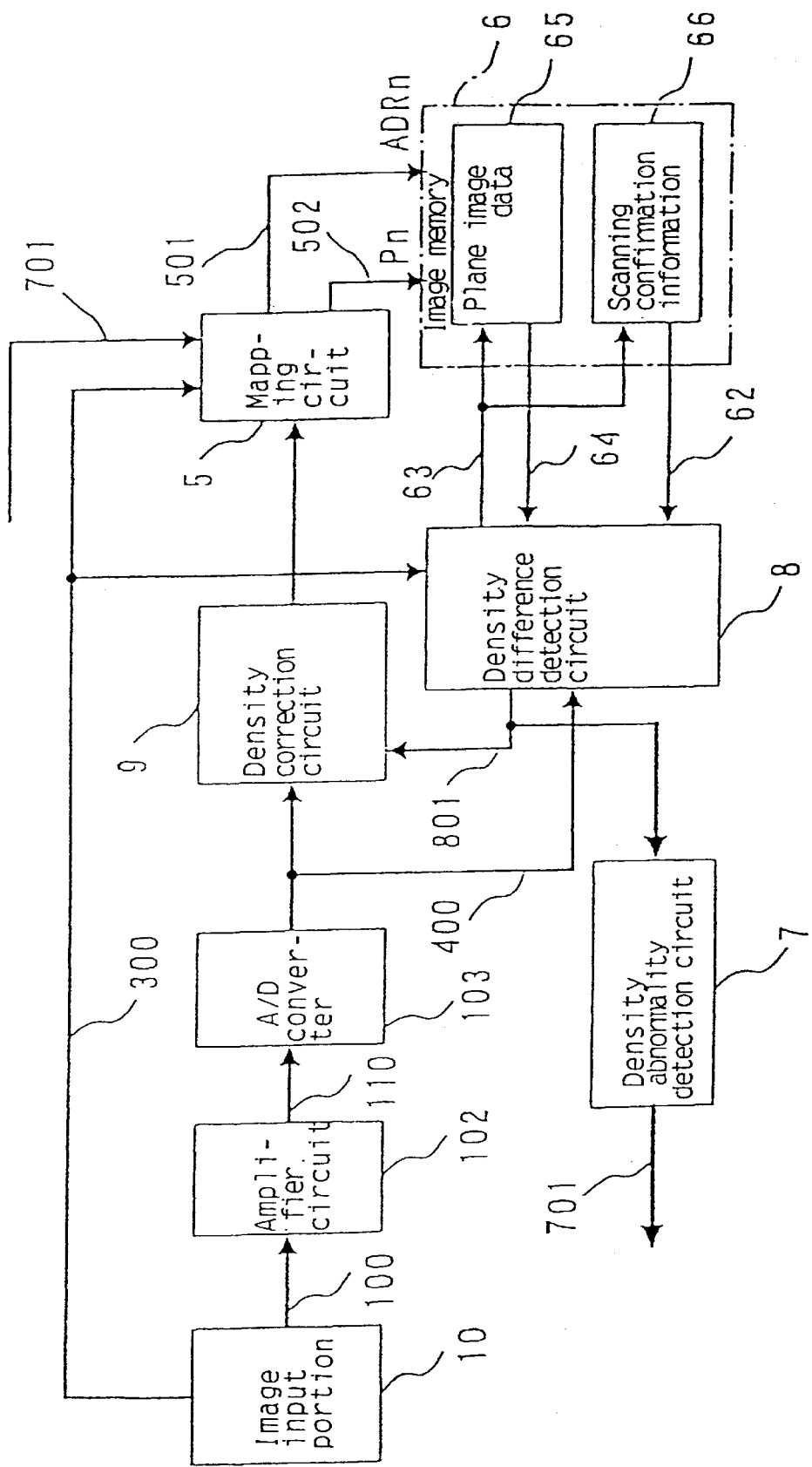
FIG. 10 is a block diagram showing the configuration of an image processing apparatus in accordance with embodiment 2 of the present invention.

FIG. 10 is a block diagram showing the configuration of the image processing apparatus in accordance with embodiment 2 of the present invention. In FIG. 10, the same reference numbers as those used in the above-mentioned embodiment 1 shown in FIG. 1 designate the same or corresponding portions.

Embodiment 2 is provided with a density abnormality detection circuit 7. Embodiment 2 differs from the above-mentioned embodiment 1 in that the density abnormality detection circuit 7 detects the density correction signal 801 generated by the density difference detection circuit 8, and delivers a judgment signal 701 indicating operation conditions to the mapping circuit 5. In other respects, embodiment 2 is identical to the above-mentioned embodiment 1.

If a change in the inclination of the main body of the hand-held scanner is within a predetermined angle, density differences due to the change can be prevented by using embodiment 1 as shown in FIG. 6. However, the main body of the hand-held scanner may be inclined considerably depending on an original unintentionally by the operator, and disturbance light other than the light from the light source 12 may enter the image sensor 1. If this occurs, the gray-level information may have lower reliability. Furthermore, if the amount of correction is large, gray level skip may occur. As a result, the quality of the image formed by the image processing apparatus is lowered significantly.

If the density differences increase, and the level of the density correction signal 801 exceeds a predetermined amount (a threshold value) and does not satisfy design specifications as a result of the lowered image quality, the density abnormality detection circuit 7 judges that the condition is abnormal, and sets the judgment signal 7 to "1". Since the image processing apparatus of embodiment 2 is configured as described above, if the density differences become very large, the mapping circuit 5 stops storing data in the image memory 6. Consequently, abnormal images can be securely prevented from being stored.

As described above, image data with abnormal density differences can be prevented from being stored in the image memory 6 by detecting density abnormality from gray-level difference information. Therefore, the image processing apparatus of embodiment 2 is effective in securely preventing image deterioration which may occur when the main body of the hand-held scanner is inclined unintentionally by the operator.

Figure 11:
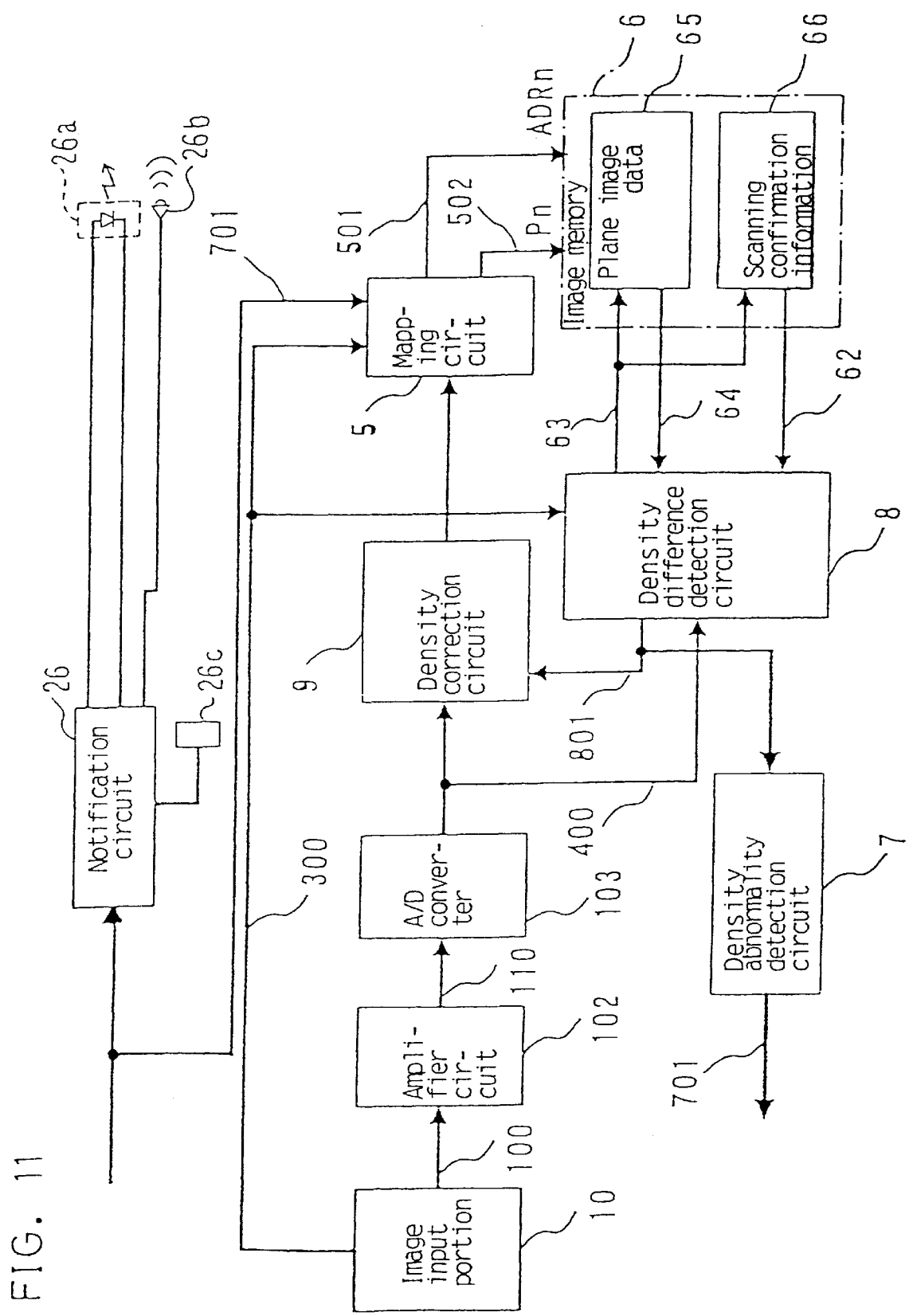
FIG. 11 is a block diagram showing the configuration of the image processing apparatus in accordance with embodiment 2 of the present invention provided with a notification circuit.

The above-mentioned embodiment 2 is configured to inhibit the mapping circuit 5 from storing data in the image memory 6 in accordance with the judgment signal 701 from the density abnormality detection circuit 7. However, in addition to or instead of this configuration wherein data is prohibited to be stored in the image memory 6, it is possible to use a configuration wherein the operator is notified of abnormality by a notification circuit 26 when the judgment signal 701 is "1". FIG. 11 is a block diagram showing the configuration of an embodiment wherein the image processing apparatus shown in FIG. 10 is provided with the notification circuit 26.

In the image processing apparatus having the configuration shown in FIG. 11, the notification circuit 26 notifies the operator of abnormality by using an LED 26a. The operator can easily monitor reading condition by using this notification. Therefore, if any abnormality occurs during input work, the operator can immediately redo the input work. Consequently, it is possible to obtain an image processing apparatus having high work efficiency.

As another embodiment (not shown), it is possible to have a configuration wherein the density correction signal 801 is judged in accordance with a plurality of threshold values by the density abnormality detection circuit 7, and the density difference is indicated by using a plurality of judgment levels obtained from the two states ("0" and "1") of the judgment signal 701 for each threshold value. By changing the number of the LEDs 26a to be turned on in accordance with the plural judgment levels as described above, the operator can monitor the reading condition securely and accurately. Furthermore, with this configuration, the operator can carry out normal reading operation. By virtue of this kind of simple confirmation mechanism, the operator can perform normal reading operation.

In addition to or instead of the LEDs used as indication means, a sound generating means, such as a buzzer 26b, can also be used to notify the operator of abnormality. By changing the sound tone of the sound generating means in accordance with the above-mentioned plural judgment levels, the operator can monitor the reading condition easily and accurately. In comparison with the embodiment described before wherein LEDs having been turned on are monitored, the present embodiment is effective in that the operator can concentrate on reading operation.

Furthermore, in addition to or instead of the LEDs used as indication means, a vibration means, such as a vibration element 26c, can also be used to notify the operator of abnormality. In this case, by changing the vibration frequency of the vibration means in accordance with plural judgment levels, the operator can monitor the reading condition by bodily sensation. In comparison with the embodiment described before wherein LEDs having been turned on are monitored, the present embodiment is effective in that the operator can concentrate on reading operation.

Embodiment 3

An image processing apparatus in accordance with embodiment 3 of the present invention will be described below referring to the accompanying drawings.

Figure 12:
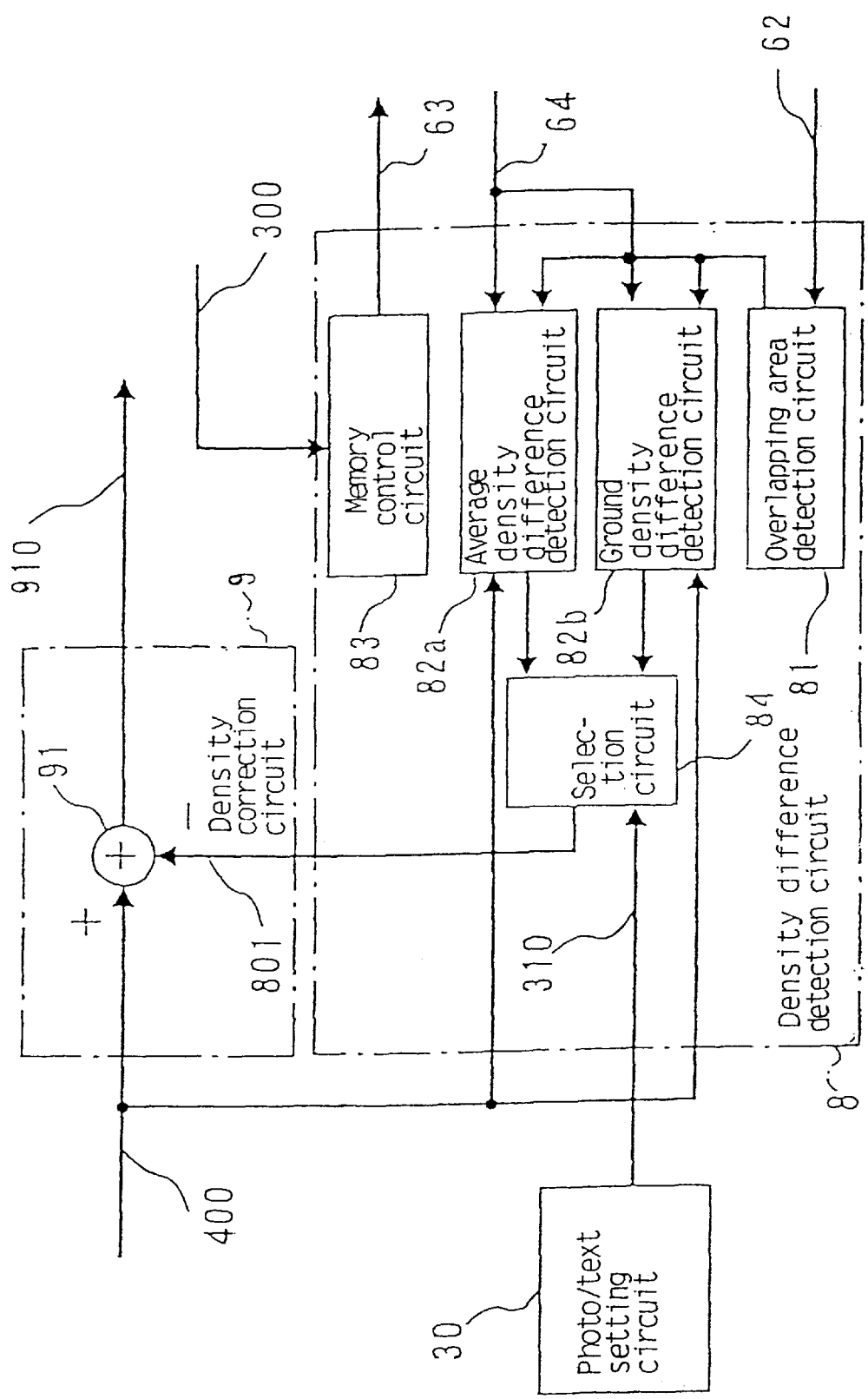
FIG. 12 is a block diagram showing the configuration of an image processing apparatus in accordance with embodiment 3 of the present invention.

FIG. 12 is a block diagram showing the configuration of the image processing apparatus in accordance with embodiment 3 of the present invention. In FIG. 12, the same reference numbers as those used in the above-mentioned embodiment 1 shown in FIG. 1 designate the same or corresponding portions.

The difference detection circuit 82 in accordance with embodiment 1 is shown as a single circuit in FIG. 8. In embodiment 3, however, the circuit comprises two circuits, that is, an average density difference detection circuit 82a and a ground density difference detection circuit 82b. Correction signals detected by the two detection circuits are selected by a selection circuit 84 to form the density correction signal 801.

Embodiment 3 differs from the above-mentioned embodiment 1 in that the selection circuit 84 is configured to operate in accordance with the "photo" or "text" processing mode designated by a photo/text setting circuit 30.

Since the image processing apparatus of embodiment 3 is configured as described above, it is possible to select a density difference correction mode depending on "text" or "photo" to be read by the operator.

When a text image is to be read, the density differences at the connection portion thereof tend to become conspicuous mainly at the ground gray levels. On the other hand, when a photo image is to be read, the gray-level differences on the entire image become conspicuous. Therefore, when "text" is to be read, ground density differences should be detected, and when "photo" is to be read, the difference in average density differences of the gray levels should be detected.

In the image processing apparatus of embodiment 3, an optimal density difference is detected depending on the type of image to be processed as described above, whereby the quality of the image can be improved.

When the "photo" mode is designated as a processing mode by the photo/text setting circuit 30, the selection circuit 84 selects the correction signal of the average density difference detection circuit 82a. When the "text" mode is designated, the selection circuit 84 selects the correction signal of the ground density difference detection circuit 82b.

In embodiment 3, the image data 400 indicating the gray levels of the original is read line by line, and the scanning position coordinates 300 corresponding to the image data 400 are detected as described above. When the image data is mapped to the image memory 6, selection is made to designate the "text" or "photo" processing mode in accordance with the image data 400 indicating the gray levels of the image having been read and the storage data stored in the image memory 6, and a desired density difference is detected from the density differences generated during scanning. The density difference is then corrected. A composite image having reduced density differences at its connection portion can be obtained by storing the corrected image data. Consequently, in embodiment 3, it is possible to provide an image reading apparatus which can read gray-scale images having improved quality for both text and photo originals.

Embodiment 4

An image reading apparatus in accordance with embodiment 4 of the present invention will be described below referring to the accompanying drawings.

Figure 13:
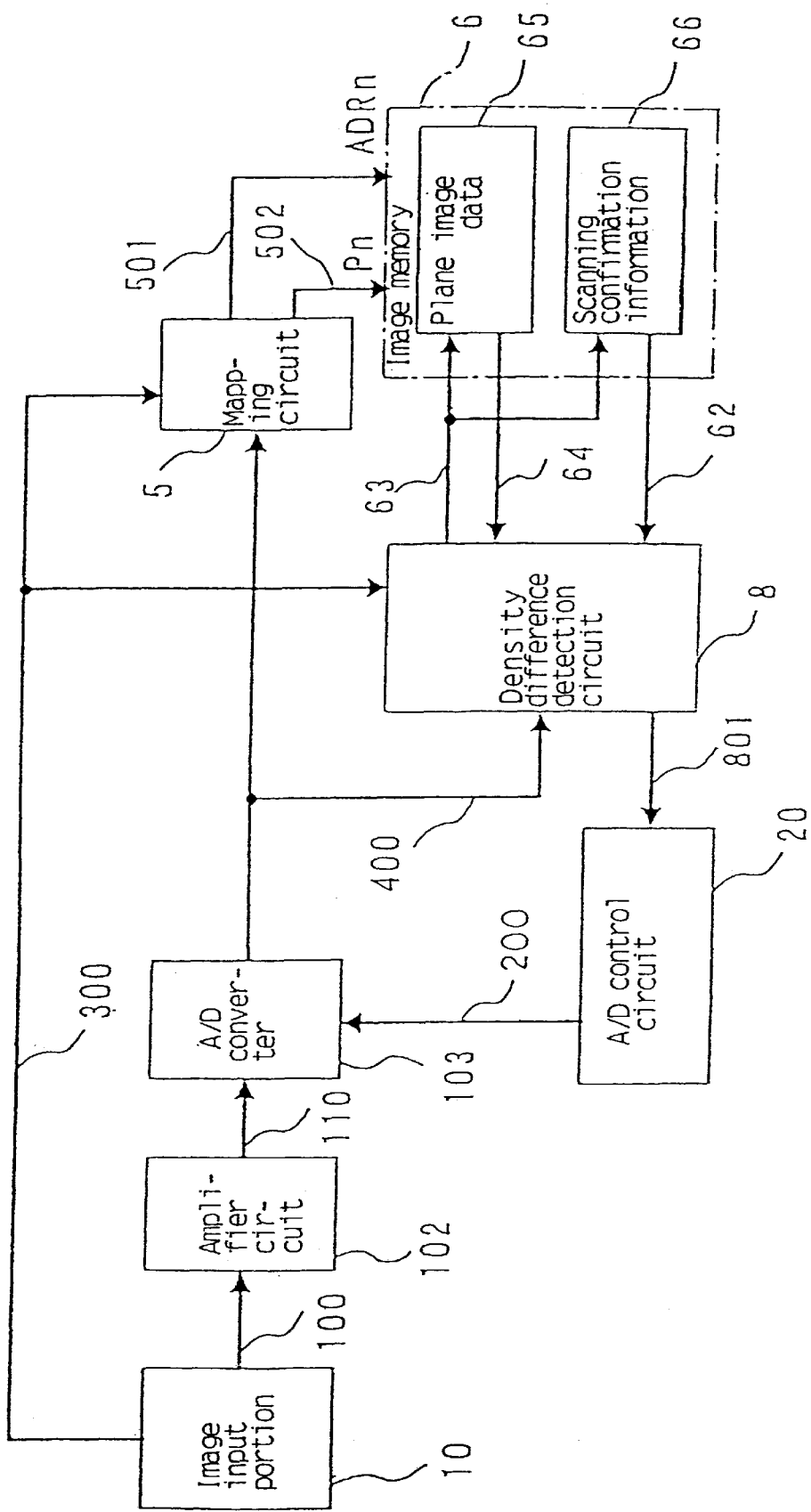
FIG. 13 is a block diagram showing the configuration of an image reading apparatus in accordance with embodiment 4 of the present invention.
Figure 25:
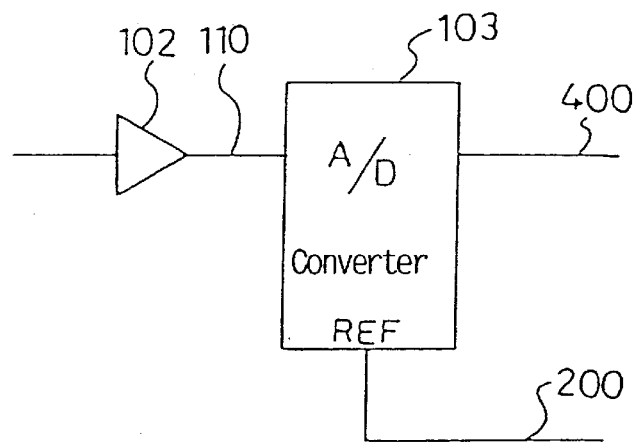
FIG. 25 is a block diagram illustrating the operation of the A/D converter of the image reading apparatus in accordance with embodiment 4 of the present invention.

FIG. 13 is a block diagram showing the configuration of the image reading apparatus in accordance with embodiment 4 of the present invention. FIG. 25 is a block diagram illustrating the operation of the A/D converter 103. In FIGS. 13 and 25, the same reference numbers as those used in the above-mentioned embodiment 1 shown in FIG. 1 designate the same or corresponding portions.

Embodiment 4 differs from embodiment 1 in that the A/D control circuit 20 is configured to control the reference voltage of the A/D converter 103 on the basis of the density correction signal 801 from the density difference detection circuit 8. In other respects, embodiment 4 is identical to embodiment 1.

The A/D converter 103 shown in FIG. 25 converts the amplification signal amplified by the amplifier circuit 102 on the basis of a reference signal 200 (REF) indicating a reference voltage. Therefore, by controlling the reference signal 200 supplied to the A/D converter 103, the A/D converter 103 can be provided with a kind of AGC (auto gain control) function. When the gray levels of the image data 400 indicating the gray levels of an original are low, the amplification signal 110 can be made larger by lowering the level of the reference signal 200 (REF) with respect to GND (ground). On the other hand, when the density of the image data 400 are high, the amplification signal 110 can be made smaller by raising the level of the reference signal 200 (REF) with respect to GND (ground). Consequently, it is possible to obtain the same correction effect as that obtained by the density correction circuit 9 of the above-mentioned embodiment 1. Therefore, the density correction circuit 9 can be eliminated from embodiment 4.

Even when the density to be read is changed gradually, the density of image data to be stored in the memory can be corrected by controlling the reference signal 200, line by line. Therefore, the image reading apparatus of embodiment 4 can generate composite images generating no gray-level difference.

As described above, the image reading apparatus of embodiment 4 reads the image data 400 indicating the gray levels of an original, line by line, and detects the scanning position coordinates 300 corresponding to the image data 400. When the image data 400 is mapped to the image memory 6, the image reading apparatus of embodiment 4 detects density differences generated during scanning on the basis of the image data 400 have been read and the storage data stored in the image memory 6. Furthermore, the image reading apparatus of embodiment 4 controls the reference signal 200 (REF) of the A/D converter 103 to correct the density differences. A composite image having reduced density differences at its connection portion can be obtained by storing the corrected image data. As a result, embodiment 4 can provide an image reading apparatus capable of reading gray-scale images having excellent image quality.

Embodiment 5

An image reading apparatus in accordance with embodiment 5 will be described below referring to the accompanying drawings.

Figure 14:
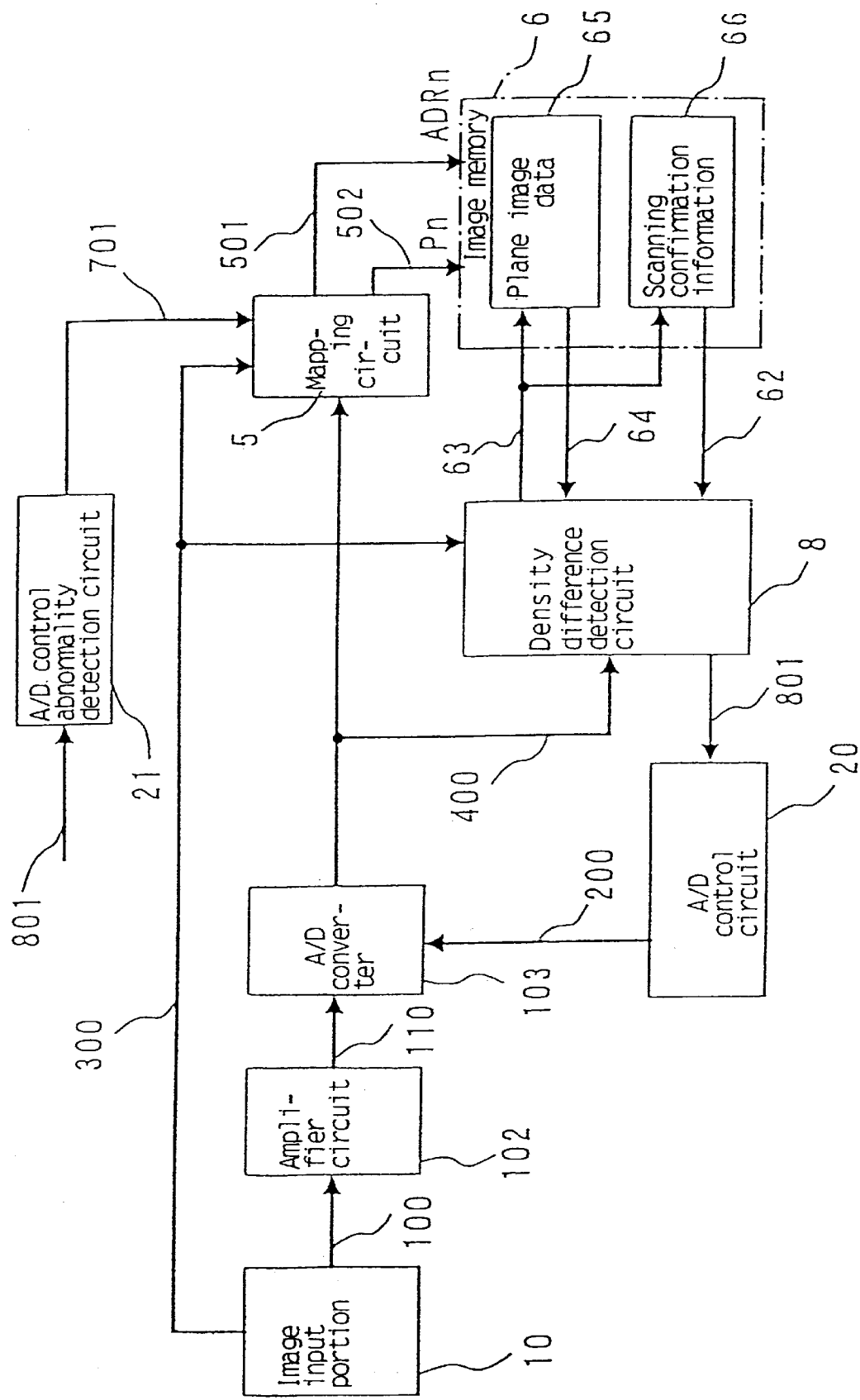
FIG. 14 is a block diagram showing the configuration of an image reading apparatus in accordance with embodiment 5 of the present invention.

FIG. 14 is a block diagram showing the configuration of the image reading apparatus in accordance with embodiment 5. Referring to FIG. 14, the same reference numbers as those used in the above-mentioned embodiment 4 shown in FIG. 13 designate the same or corresponding portions.

In embodiment 5, an A/D control abnormality detection circuit 21 judges whether the correction amount of the density correction signal 801 from the density difference detection circuit 8 is larger than a predetermined value (threshold value). When the correction amount of the density correction signal 801 is larger than the predetermined value, the A/D control abnormality detection circuit 21 judges that this condition is abnormal, and sets the judgment signal 701 to "1". Furthermore, when the correction amount of the density correction signal 801 is smaller than the predetermined value, the A/D control abnormality detection circuit 21 judges that this condition is normal, and sets the judgment signal 701 to "0". The image reading apparatus of embodiment 5 differs from the apparatus of embodiment 4 in the above-mentioned configuration. In other respects, the apparatus of embodiment 5 is identical to that of embodiment 4.

In the image reading apparatus of embodiment 5, data storage in the image memory 6 is stopped by the mapping circuit 5 when the judgment signal 701 becomes "1". Therefore, only the image data within a range wherein the A/D converter 103 of embodiment 5 functions normally can be stored in the image memory 6. As a result, the image reading apparatus of embodiment 5 can securely prevent abnormal image data from being stored.

Figure 15:
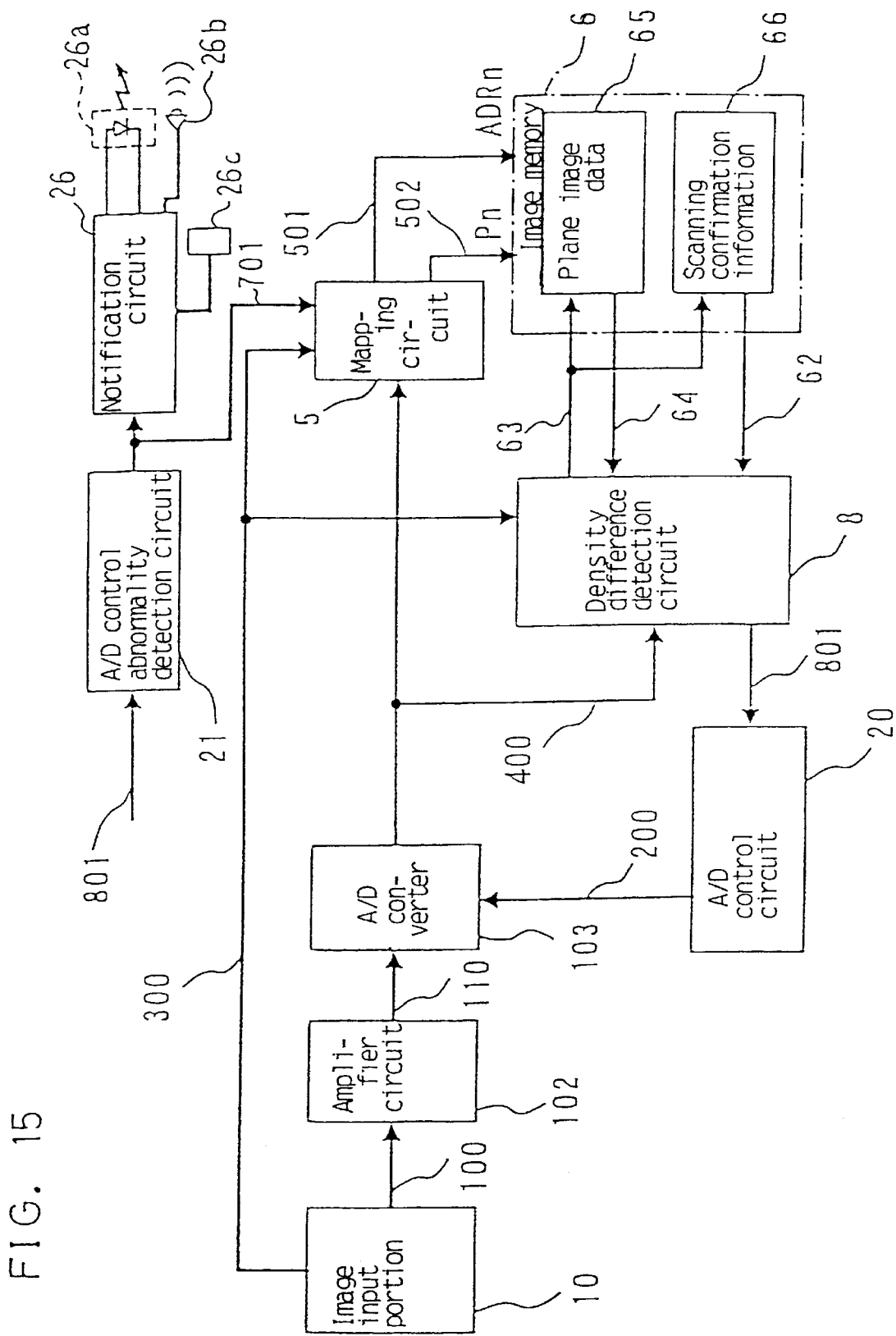
FIG. 15 is a block diagram showing the configuration of the image reading apparatus in accordance with embodiment 5 of the present invention provided with a notification circuit.

The above-mentioned embodiment 5 is configured to inhibit the mapping circuit 5 from storing data in the image memory 6 in accordance with the judgment signal 701 from the A/D control abnormality detection circuit 21. However, in addition to or instead of this configuration wherein data is prohibited to be stored in the image memory 6, it is possible to use a configuration wherein the operator is notified of abnormality by the notification circuit 26 when the judgment signal 701 is "1". FIG. 15 is a block diagram showing the configuration of an embodiment wherein the image processing apparatus shown in FIG. 14 is provided with the notification circuit 26.

In the image processing apparatus having the configuration shown in FIG. 15, the notification circuit 26 notifies the operator of abnormality by using the LED 26a. The operator can easily monitor the reading condition by using this notification. Therefore, if any abnormality occurs during input work, the operator can immediately redo the input work. Consequently, it is possible to obtain an image processing apparatus having high work efficiency.

As another embodiment (not shown), it is possible to have a configuration wherein the density correction signal 801 is judged in accordance with a plurality of threshold values by the A/D control abnormality detection circuit 21, and the density difference is indicated by using a plurality of judgment levels obtained from the two states ("0" and "1") of the judgment signal 701 for each threshold value. By changing the number of the LEDs 26a to be turned on in accordance with the plural judgment levels as described above, the operator can monitor the reading condition securely and accurately. The operator can carry out normal reading operation. By virtue of this kind of simple confirmation mechanism, the operator can perform normal reading operation.

In addition to or instead of the LEDs used as indication means, a sound generating means, such as the buzzer 26b, can also be used to notify the operator of abnormality. By changing the sound tone of the sound generating means in accordance with the above-mentioned plural judgment levels, the operator can monitor the reading condition easily and accurately. In comparison with the embodiment described before wherein LEDs having been turned on are monitored, the present embodiment is effective in that the operator can concentrate on reading operation.

Furthermore, in addition to or instead of the LEDs used as indication means, a vibration means, such as the vibration element 26c, can also be used to notify the operator of abnormality. In this case, by changing the vibration frequency of the vibration means in accordance with plural judgment levels, the operator can monitor the reading condition by bodily sensation. In comparison with the embodiment described before wherein LEDs having been turned on are monitored, the present embodiment is effective in that the operator can concentrate on reading operation.

Embodiment 6

An image reading apparatus in accordance with embodiment 6 of the present invention will be described below referring to the accompanying drawings.

Figure 16:
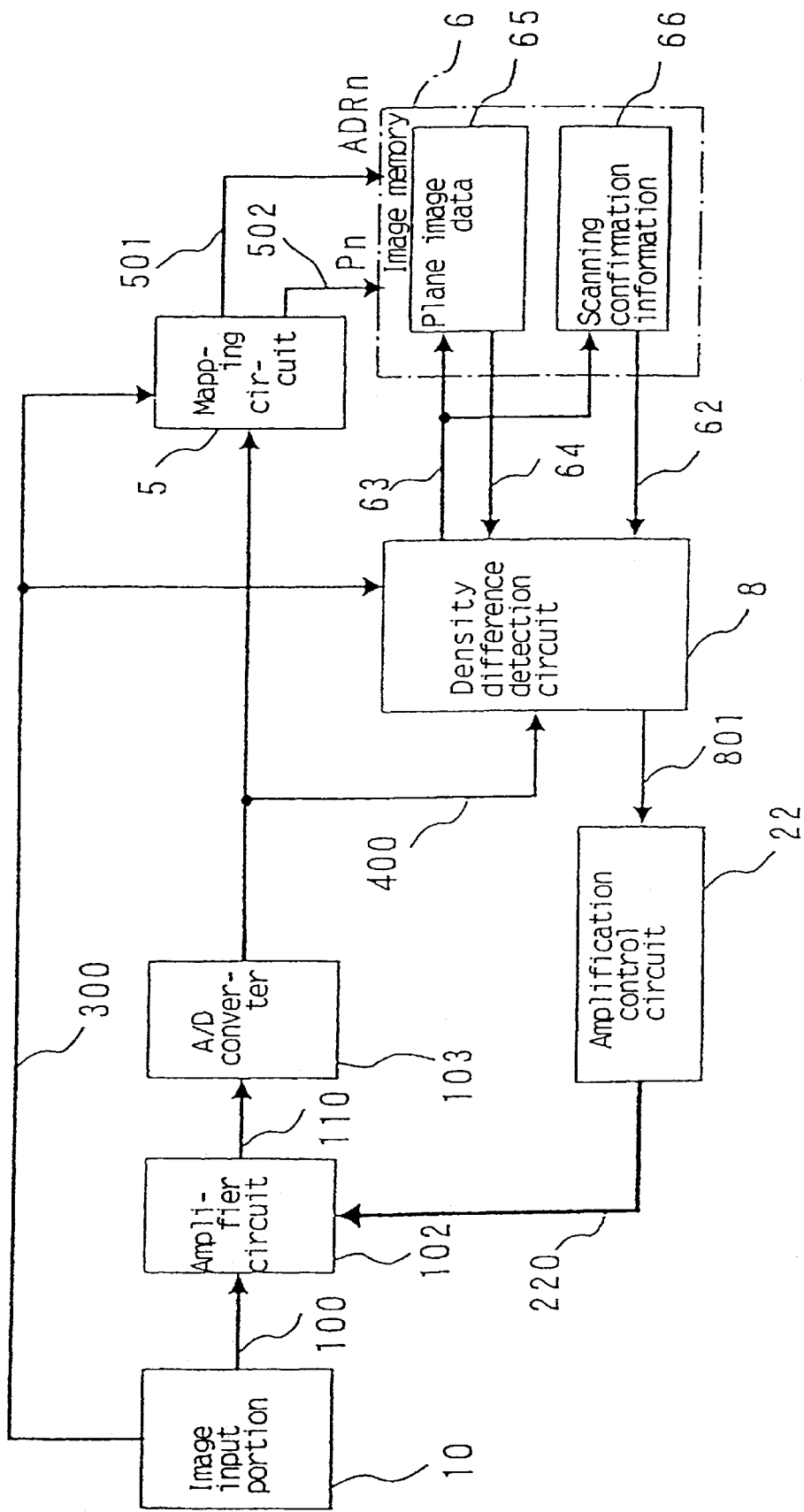
FIG. 16 is a block diagram showing the configuration of an image reading apparatus in accordance with embodiment 6
Figure 26:
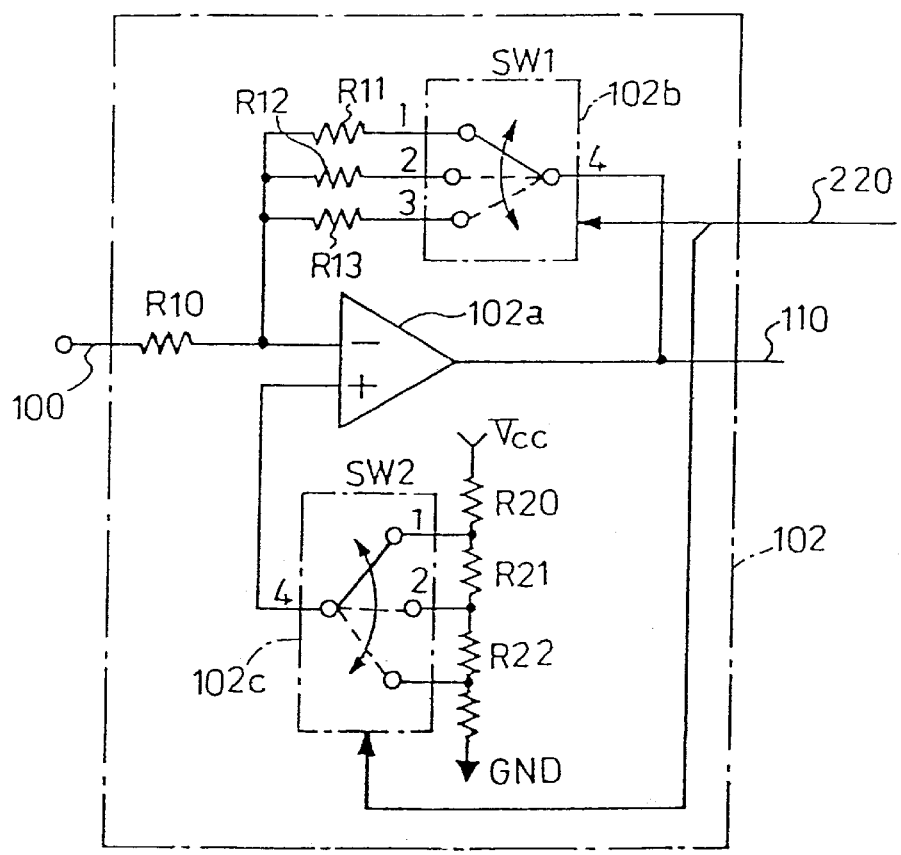
FIG. 26 is a circuit diagram showing the amplifier circuit of the image reading apparatus in accordance with embodiment 6 of the present invention.

FIG. 16 is a block diagram showing the configuration of the image reading apparatus in accordance with embodiment 6 of the present invention. In FIG. 16, the same reference numbers as those used in the above-mentioned embodiment 4 shown in FIG. 13 designate the same or corresponding portions. FIG. 26 is a circuit diagram showing an example of the amplifier circuit 102 in accordance with embodiment 6 of the present invention. FIG. 27 is a graph illustrating offset adjustment at the amplifier circuit 102. FIG. 28 is a graph illustrating gain adjustment at the amplifier circuit 102.

Embodiment 6 differs from the above-mentioned embodiment 4 in that the amplification control circuit 22 controls the amplitude or offset voltage of the amplifier circuit 102 on the basis of the density correction signal 801 from the density difference detection circuit 8. In other respects, embodiment 6 is identical to embodiment 4.

The amplifier circuit 102 changes its amplitude as shown in FIG. 28 by changing the resistance value of a feedback resistor by switching a selection switch SW1 (102b) as shown in FIG. 26. In FIG. 28, SW1 (1–4) indicates that the terminals 1 and 4 of the selection switch 102b are connected to each other, and that the characteristic of the amplitude at this time is gain=C. In the same way, gain=B and gain=A can be attained by switching the selection switch 102b.

Furthermore, offset adjustment in embodiment 6 can be attained by switching the selection switch SW2 (102c). As shown in FIG. 27, offset voltage can be changed by switching the selection switch 102c. In FIG. 27, SW2 (1–4) indicates that the terminals 1 and 4 of the selection switch 102c are connected to each other. Adjustment is carried out so that an image signal 100 having an output value Oc can be obtained when an input value IN is supplied. In the same way, the image signal 100 can have an output value Oa or Ob in accordance with the switching of the selection switch 102c. The two selection switches 102b, 102c are controlled by a control signal 220.

The amplifier circuit 102 amplifies the image signal 100 from the image input portion 10 and converts its level into a predetermined voltage. Therefore, by controlling the amplitude of the amplifier circuit 102 by using the control signal 220, the image reading apparatus of embodiment 6 can has a kind of AGC (auto gain control) function. When the density of the data in the image signal 100 are low, the output signal 110 of the amplifier circuit 102 can be made larger by increasing the amplitude. On the other hand, when the density of the data in the image signal 100 are high, the output signal 110 of the amplifier circuit 102 can be made smaller by decreasing the amplitude.

The offset voltage can be corrected for density difference correction. When the density of the data in the image signal 100 are low, the output signal 110 of the amplifier circuit 102 can be made larger by raising the offset voltage. On the other hand, when the gray levels of the data in the image signal 100 are high, the output signal 110 of the amplifier circuit 102 can be made smaller by lowering the offset voltage.

In the image reading apparatus of embodiment 6, the amplitude and the offset voltage are controlled line by line. Therefore, even when the density to be read are changed gradually, the density of image data to be stored in the memory can be corrected, whereby the image reading apparatus of embodiment 6 can generate composite images having no gray-level difference.

With this configuration, the image reading apparatus of embodiment 6 has the same correction effect as that of the density correction circuit 9 of embodiment 1, although the image reading apparatus of embodiment 6 is not provided with the density correction circuit 9.

As described above, the image reading apparatus of embodiment 6 reads the image data 400, that is, gray-level data of an original, line by line, and detects the scanning position coordinates 300 corresponding to the image data 400. When the image data 400 is mapped to the image memory 6, the image reading apparatus of embodiment 6 detects density differences generated during scanning from the image data 400 having been read and the storage data in the image memory 6. On the basis of the density differences, the apparatus controls the amplitude of the amplifier circuit 102 to correct the density differences.

In the image reading apparatus of embodiment 6, a composite image having reduced density differences at the connection portion can be obtained by storing the corrected image data. As a result, embodiment 6 can provide an image reading apparatus capable of reading gray-scale images having excellent image quality.

Embodiment 7

An image reading apparatus in accordance with embodiment 7 of the present invention will be described below referring to the accompanying drawings.

Figure 17:
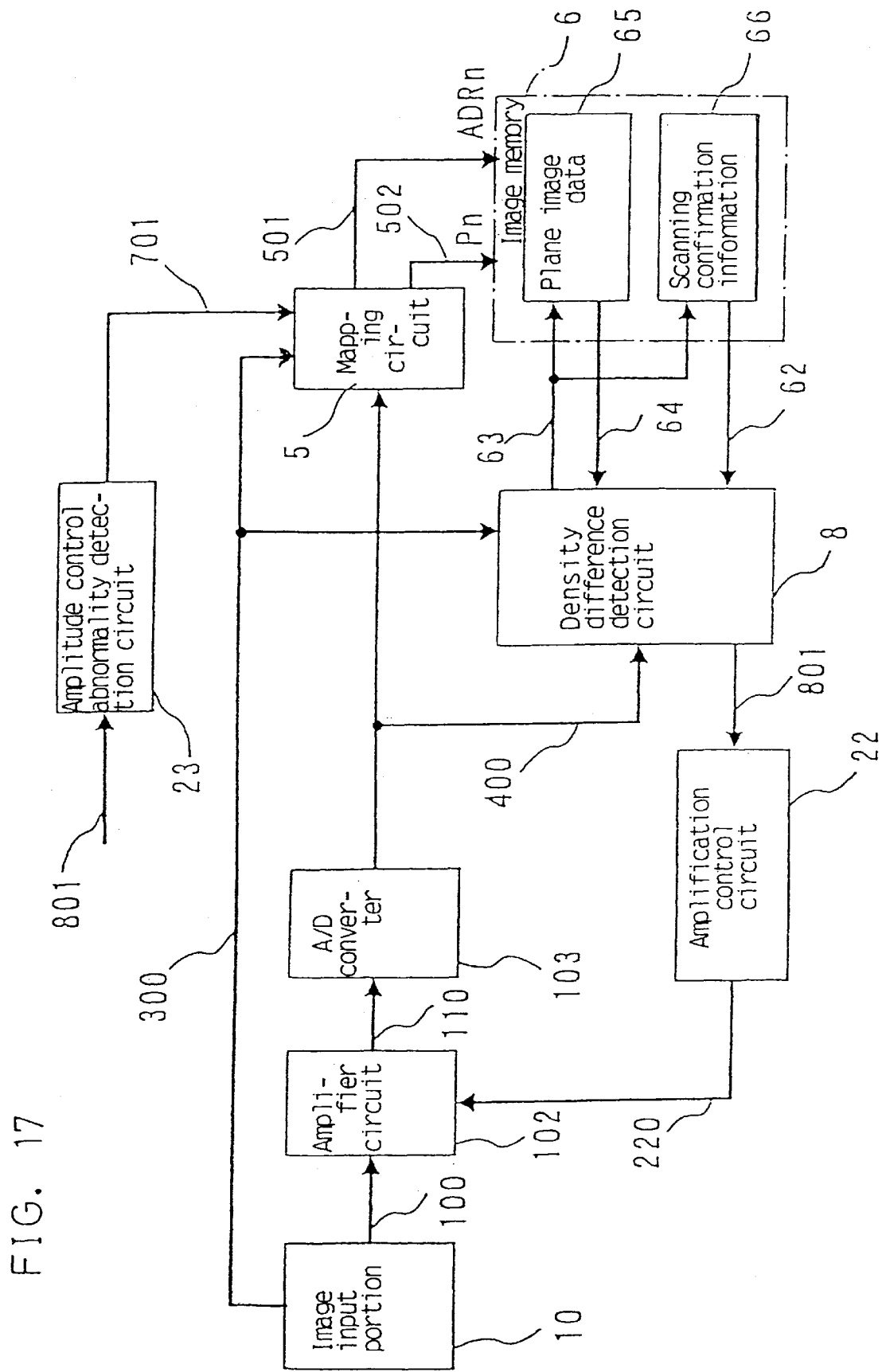
FIG. 17 is a block diagram showing the configuration of an image reading apparatus in accordance with embodiment 7 of the present invention.

FIG. 17 is a block diagram showing the configuration of the image reading apparatus in accordance with embodiment 7 of the present invention. In FIG. 17, the same reference numbers as those used in the above-mentioned embodiment 6 shown in FIG. 16 designate the same or corresponding portions.

In embodiment 7, an amplitude control abnormality detection circuit 23 judges whether the correction amount of the density correction signal 801 from the density difference detection circuit 8 is smaller than a predetermined value (threshold value). When the correction amount of the density correction signal 801 is larger than the predetermined value, the amplitude control abnormality detection circuit 23 judges that this condition is abnormal, and sets the judgment signal 701 to "1". On the other hand, when the correction amount of the density correction signal 801 is smaller than the predetermined value, the amplitude control abnormality detection circuit 23 judges that this condition is normal, and sets the judgment signal 701 to "0". The image reading apparatus of embodiment 7 differs from the apparatus of embodiment 6 in the above-mentioned configuration. In other respects, the apparatus of embodiment 7 is identical to that of embodiment 6. In embodiment 7, when the correction amount is smaller than the predetermined value, it means that the image reading apparatus is operated within a normal amplification range. If a small signal is amplified, its S/N ratio becomes low, noise appears in an image, and the quality of the image is lowered. On the other hand, if a large signal is amplified, the signal is saturated, and an abnormal image is generated. Therefore, it is necessary to amplify a signal having a magnitude within a proper range in the image reading apparatus. When a density difference has a value larger than the design specification value, this indicates that the magnitude of the image signal 100 is outside the proper range.

In the above-mentioned operation, when the judgment signal is "1", the mapping circuit 5 stops storing data in the image memory 6. Therefore, only the image data within a range wherein the amplifier circuit 102 functions normally can be stored in the image memory 6. As a result, the image reading apparatus of embodiment 7 can securely prevent abnormal image data from being stored.

Figure 18:
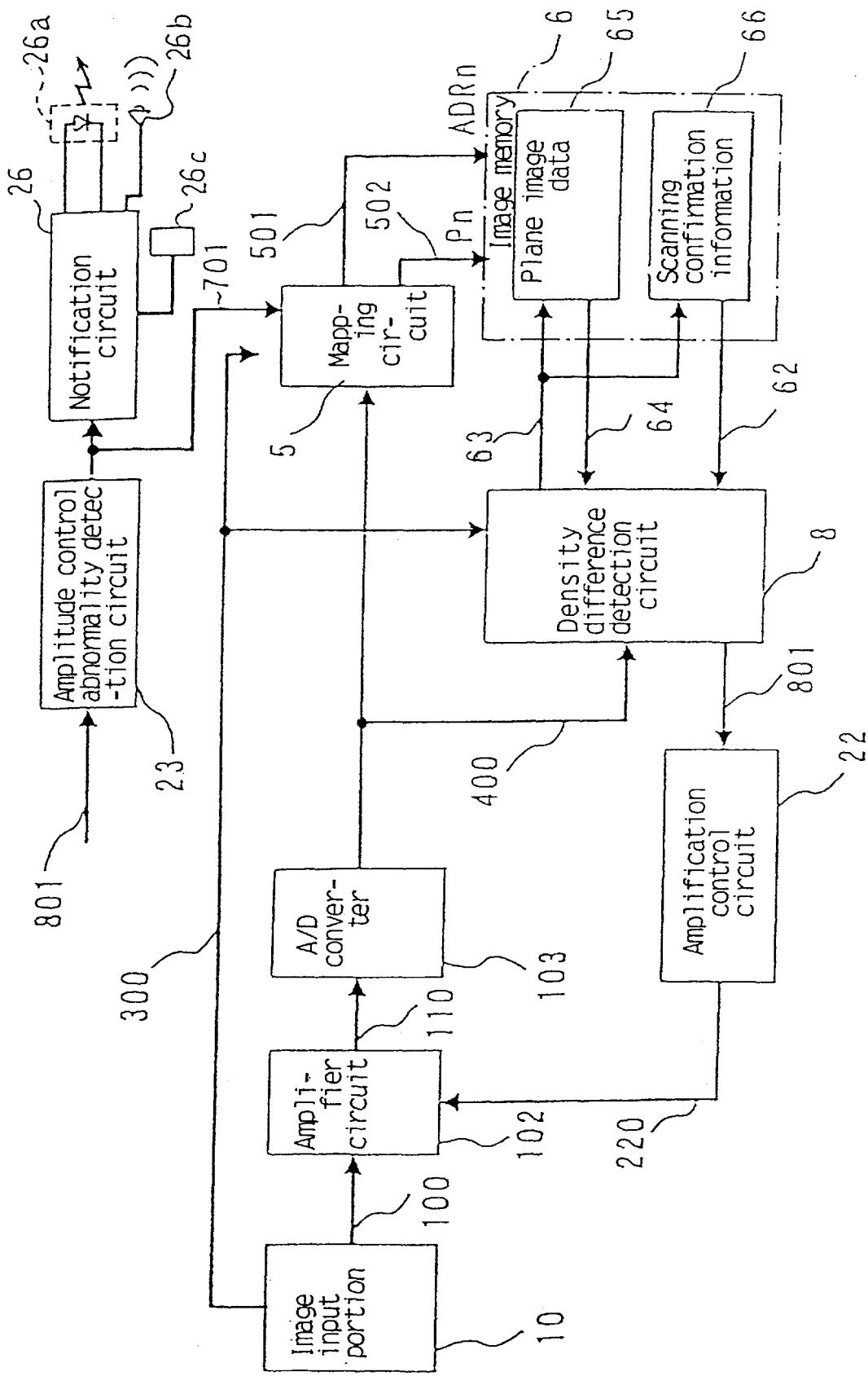
FIG. 18 is a block diagram showing the configuration of the image reading apparatus in accordance with embodiment 7 of the present invention provided with a notification circuit.

The above-mentioned embodiment 7 is configured to inhibit the mapping circuit 5 from storing data in the image memory 6 in accordance with the judgment signal 701 from the amplitude control abnormality detection circuit 23. However, in addition to or instead of this configuration wherein data is prohibited to be stored in the image memory 6, it is possible to use a configuration wherein the operator is notified of abnormality by the notification circuit 26 when the judgment signal 701 is "1". FIG. 18 is a block diagram showing the configuration of an embodiment wherein the image processing apparatus shown in FIG. 17 is provided with the notification circuit 26.

In the image processing apparatus having the configuration shown in FIG. 18, the notification circuit 26 notifies the operator of abnormality by using the LED 26*a*. The operator can easily monitor the reading condition by using this notification. Therefore, if any abnormality occurs during input work, the operator can immediately redo the input work. Consequently, it is possible to obtain an image processing apparatus having high work efficiency.

As another embodiment (not shown), it is possible to have a configuration wherein the density correction signal 801 is judged in accordance with a plurality of threshold values by the amplitude control abnormality detection circuit 23, and the density difference is indicated by using a plurality of judgment levels obtained from the two states ("0" and "1") of the judgment signal 701 for each threshold value. By changing the number of the LEDs 26*a* to be turned on in accordance with the plural judgment levels as described above, the operator can monitor the reading condition securely and accurately. The operator can carry out normal reading operation. By virtue of this kind of simple confirmation mechanism, the operator can perform normal reading operation.

In addition to or instead of the LEDs used as indication means, a sound generating means, such as the buzzer 26*b*, can also be used to notify the operator of abnormality. By changing the sound tone of the sound generating means in accordance with the above-mentioned plural judgment levels, the operator can monitor the reading condition easily and accurately. In comparison with the embodiment described before wherein LEDs having been turned on are monitored, the present embodiment is effective in that the operator can concentrate on reading operation.

Furthermore, in addition to or instead of the LEDs used as indication means, a vibration means, such as the vibration element 26*c*, can also be used to notify the operator of abnormality. In this case, by changing the vibration frequency of the vibration means in accordance with plural judgment levels, the operator can monitor the reading condition by bodily sensation. In comparison with the embodiment described before wherein LEDs having been turned on are monitored, the present embodiment is effective in that the operator can concentrate on reading operation.

Embodiment 8

An image reading apparatus in accordance with embodiment 8 of the present invention will be described below referring to the accompanying drawings.

Figure 19:
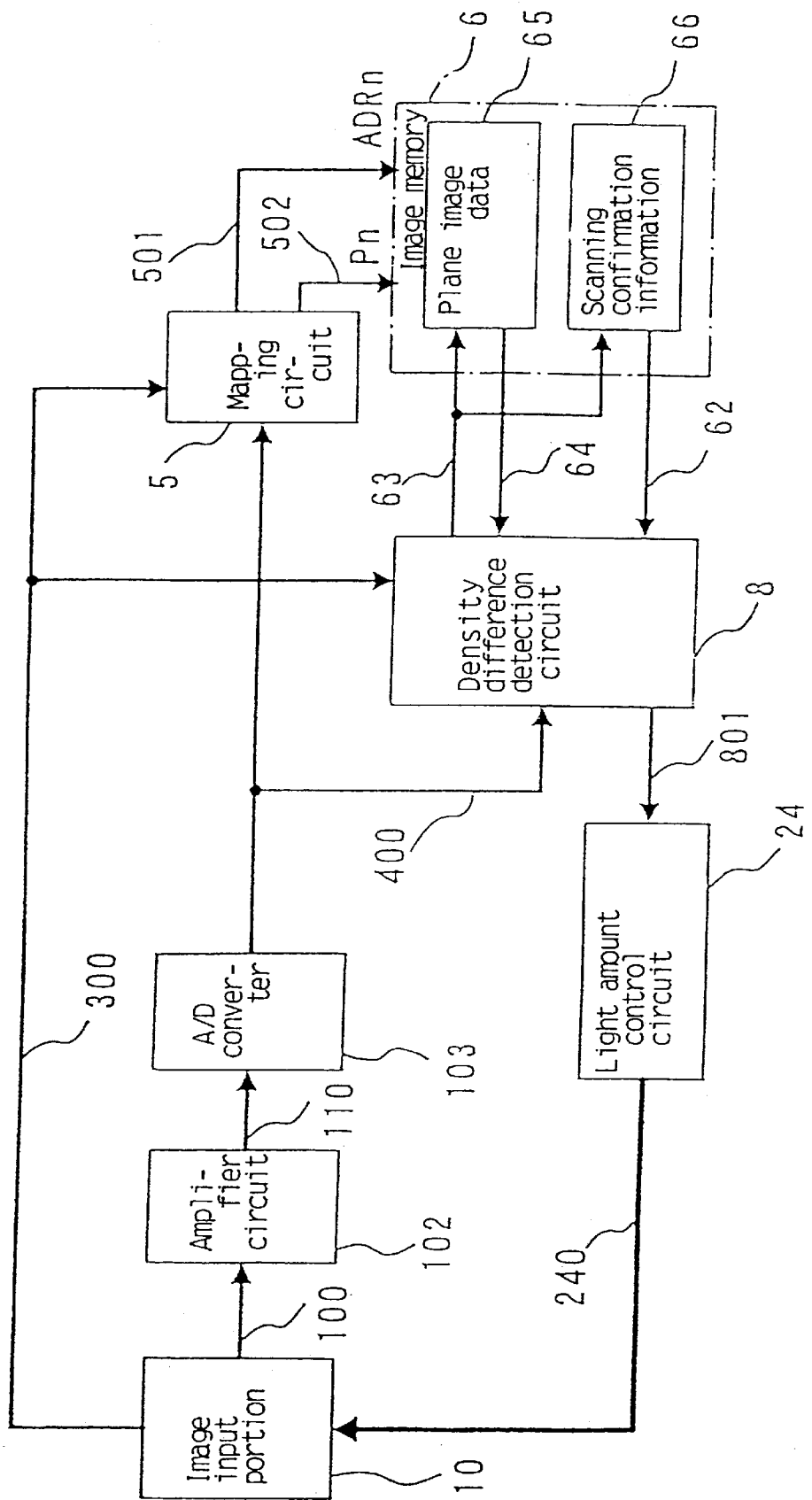
FIG. 19 is a block diagram showing the configuration of an image reading apparatus in accordance with embodiment 8 of the present invention.
Figure 30:
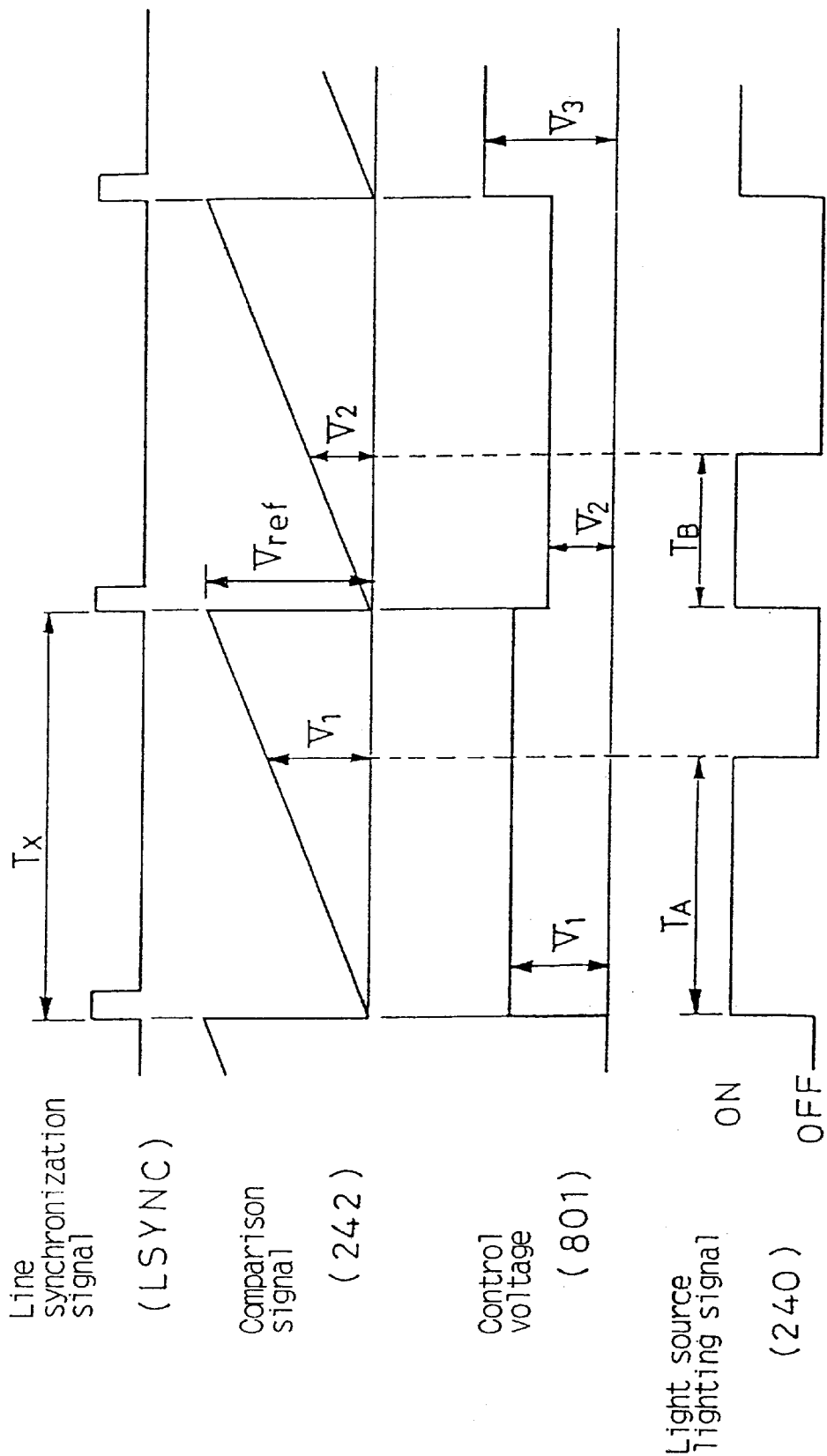
FIG. 30 is a timing chart illustrating the operation of the light amount control circuit of the image reading apparatus in accordance with embodiment 8 of the present invention.

FIG. 19 is a block diagram showing the configuration of the image reading apparatus in accordance with embodiment 8 of the present invention. In FIG. 19, the same reference numbers as those used in the above-mentioned embodiment 4 shown in FIG. 13 designate the same or corresponding portions. FIG. 29 is a block diagram showing a light amount control circuit 24 in accordance with embodiment 8. FIG. 30 is a timing chart illustrating the operation of the light amount control circuit 24.

Embodiment 8 differs from the above-mentioned embodiment 4 in that the light amount control circuit 24 is configured to control the drive current of the light source drive circuit 11 of the above-mentioned embodiment 1 shown in FIG. 2. In other respects, embodiment 8 is identical to embodiment 4.

The light source drive circuit 11 (FIG. 2) in the image input portion 10 is a drive circuit for turning on the light source 12. The circuit adjusts the amount of light stored in the line image sensor 1 depending on the lighting time to change its output during reading.

As shown in FIG. 29, in the light amount control circuit 24, a comparator 241 compares a comparison signal 242 from a signal generation circuit 243 with a control voltage 801 from the density difference detection circuit 8. As a result, the comparator 241 delivers a drive signal for controlling ON (turning on)/OFF (turning off) operation to the light source drive circuit 11.

As shown in FIG. 30, the comparison signal 242 is repeated in a constant period Tx in synchronization with a line synchronization (LSYNC) signal. The signal voltage of the comparison signal 242 changes in the range of 0 to Vref. When it is assumed that the control voltage 801 is V1, and when the signal voltage of the comparison signal 242 is lower than V1, a light source lighting signal 242 becomes ON. On the other hand, when the signal voltage of the comparison signal 242 is larger than V1, the light source lighting signal 240 becomes OFF. As a result, the turning ON period of the light source lighting signal 240 becomes TA. While the light source lighting signal 240 becomes ON, the light source drive circuit 12 turns on the light source 12. In the same way, when the control voltage 801 is V2 (<V1), the turning ON period of the light source lighting signal 240 becomes TB (<TA). In this way, the turning ON period of the light source 12 can be controlled by controlling the control voltage 801.

The amount of light stored in the line image sensor 1 is changed by changing the turning ON period of the light source 12. As a result, it is possible to change the level of the output delivered from the line image sensor 1.

When density to be read are low, the image signal 100 from the image sensor 1 can be made larger by raising the control voltage 801 and by increasing the turning ON drive period. On the other hand, when the density to be read is high, the image signal 100 from the image sensor 1 can be made smaller by lowering the control voltage 801 and by decreasing the turning ON drive period.

As described above, in embodiment 8, the turning ON period can be controlled line by line by using the control voltage 801 synchronized with the line synchronization signal. Therefore, even when the gray levels to be read are changed gradually, the image reading apparatus of embodiment 8 can correct the density of image data to be stored in the memory, and can thus create a composite image having no gray-level difference.

Figure 31:
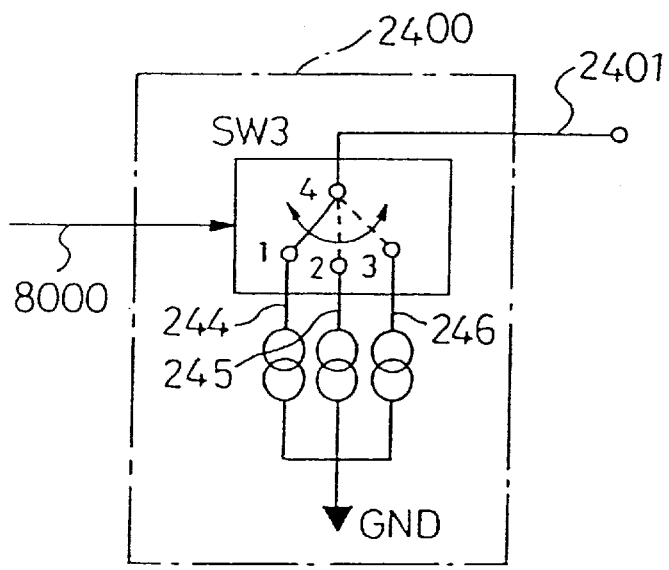
FIG. 31 is a block diagram showing another light amount control circuit for controlling the amount of light in the image reading apparatus in accordance with embodiment 8 of the present invention.

FIG. 31 is a block diagram showing another light amount control circuit 2400 for controlling the amount of light of the light source 12 (FIG. 2) by changing current. With the circuit configuration shown in FIG. 31, the output of the image sensor 1 can be controlled by current control. In the light amount control circuit 2400, a control voltage 8000 having been supplied is changed by the selection control signal of a selection switch SW3. In addition, one of current sources 244 to 246 is selected as an output by the selection switch SW3, and a light source turning ON signal 2401 is delivered to the light source drive circuit 11 (FIG. 2) of the image input portion 10.

When the signal is supplied from the light amount control circuit 2400, the light source drive circuit 11 keeps the light source 12 turned on by using the current of the current source supplied from the light amount control circuit 2400.

In the present embodiment, the amount of light of the light source 12 can be increased by increasing the current supplied to the light source 12. On the other hand, the amount of light of the light source 12 can be decreased by dereasing the current supplied to the light source 12.

The output of the image sensor 1 is determined by accumulation of the amount of light. Therefore, the amount of light to be accumulated can be corrected by controlling the intensity of the light, whereby the image signal 100 can be corrected. In the present embodiment, the intensity of the light can be controlled by the current supplied from the light amount control circuit 2400.

When density to be read are low, a current source having a large current value is selected to magnify the image signal 100 from the image sensor 1. On the other hand, when the density to be read are high, a current source having a small current value is selected to weaken the image signal 100 from the image sensor 1.

In the present embodiment, by controlling the turning ON period of the light source 12 and by controlling the drive current for the light source 12, line by line, the density of image data to be stored in the memory can be corrected, even when the density to be read are changed gradually. Consequently, the image reading apparatus of the present embodiment can create a composite image having no gray-level difference.

Since the image reading apparatus of embodiment 8 is configured as described above, the apparatus can obtain the same effect as that obtained by the density correction circuit 9 of embodiment 1, thereby eliminating the need for the density correction circuit 9 of embodiment 1.

In addition to reading the image data 400 indicating the gray levels on an original, line by line, the image reading apparatus of embodiment 8 detects the scanning position coordinates 300 corresponding to the image data 400. When the image data 400 is mapped to the image memory 6, the image reading apparatus of embodiment 8 detects density differences generated during scanning from the image data 400 having been read and the storage data in the image memory 6. By controlling the drive current to the light source on the basis of the detected density differences, the image reading apparatus of embodiment 8 can correct the density differences.

Therefore, by storing the corrected image data, the image reading apparatus of embodiment 8 can obtain a composite image having reduced density differences at the connection portion. Consequently, an image reading apparatus capable of reading gray-scale images having improved image quality can be obtained in accordance with embodiment 8.

Embodiment 9

An image reading apparatus in accordance with embodiment 9 will be described below referring to the accompanying drawings.

Figure 20:
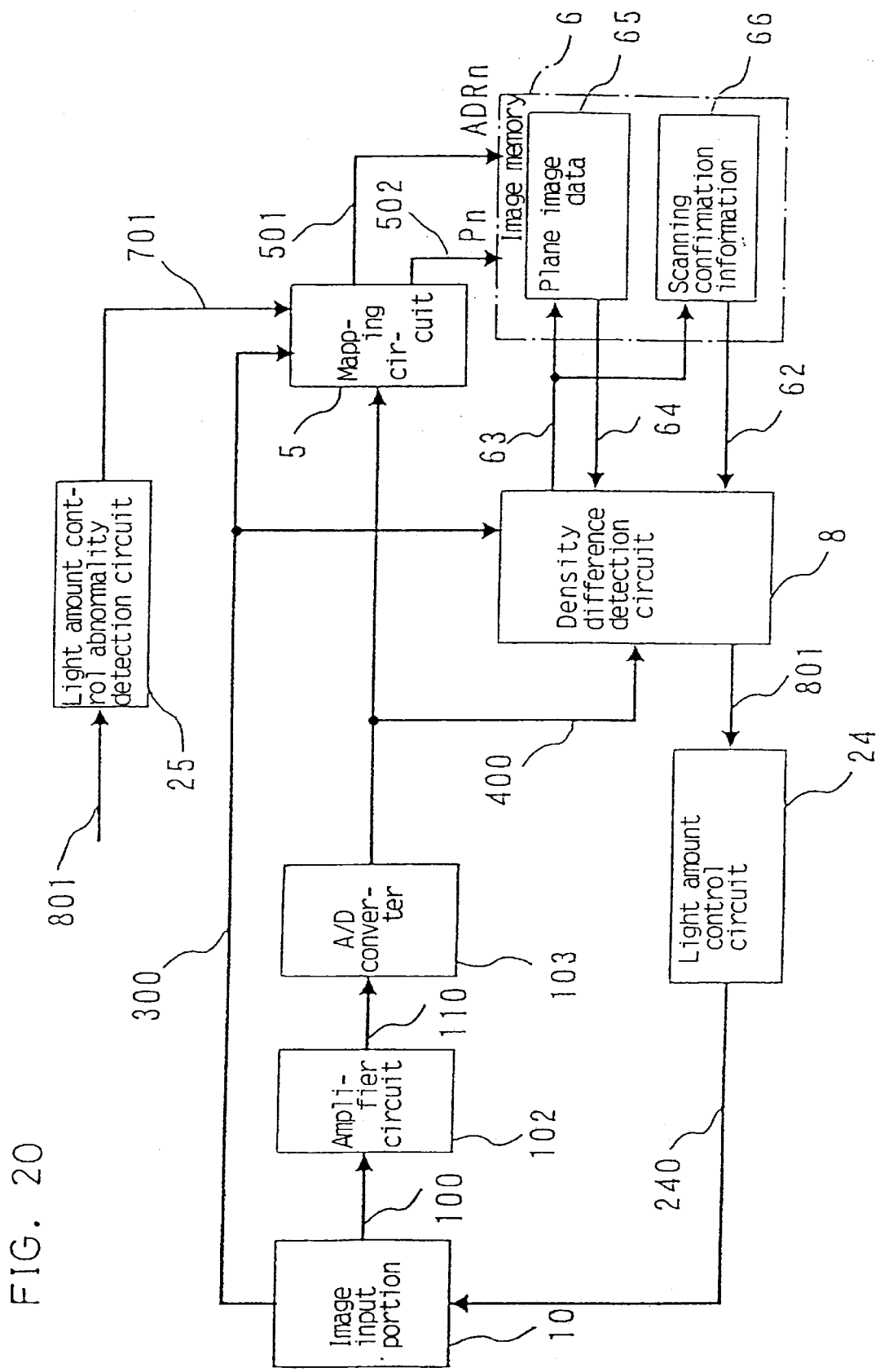
FIG. 20 is a block diagram showing the configuration of an image reading apparatus in accordance with embodiment 9 of the present invention.

FIG. 20 is a block diagram showing the configuration of the image reading apparatus in accordance with embodiment 9 of the present invention. In FIG. 20, the same reference numbers as those used in the above-mentioned embodiment 8 shown in FIG. 19 designate the same or corresponding portions.

In embodiment 9, a light amount control abnormality detection circuit 25 judges whether the correction amount of the density correction signal 801 from the density difference detection circuit 8 is larger than a predetermined value (threshold value). When the correction amount of the density correction signal 801 is larger than the predetermined value, the light amount control abnormality detection circuit 25 judges that this condition is abnormal, and sets a judgment signal 701 to On the other hand, when the correction amount of the density correction signal 801 is smaller than the predetermined value, the light amount control abnormality detection circuit 25 judges that this condition is normal, and sets the judgment signal 701 to "0". The image reading apparatus of embodiment 9 differs from the apparatus of the above-mentioned embodiment 8 in the above-mentioned configuration. In other respects, the apparatus of embodiment 9 is identical to that of embodiment 8.

In embodiment 9 having the above-mentioned configuration, data storage in the image memory 6 is stopped by the mapping circuit 5 when the judgment signal 701 becomes "1". Therefore, only the image data generated when the drive current from the light source drive circuit 11 of the image input portion 10 shown before in FIG. 2 to the light source 12 is within a normal range can be stored in the image memory 6. As a result, the image reading apparatus of embodiment 9 can securely prevent abnormal image data from being stored.

Figure 21:
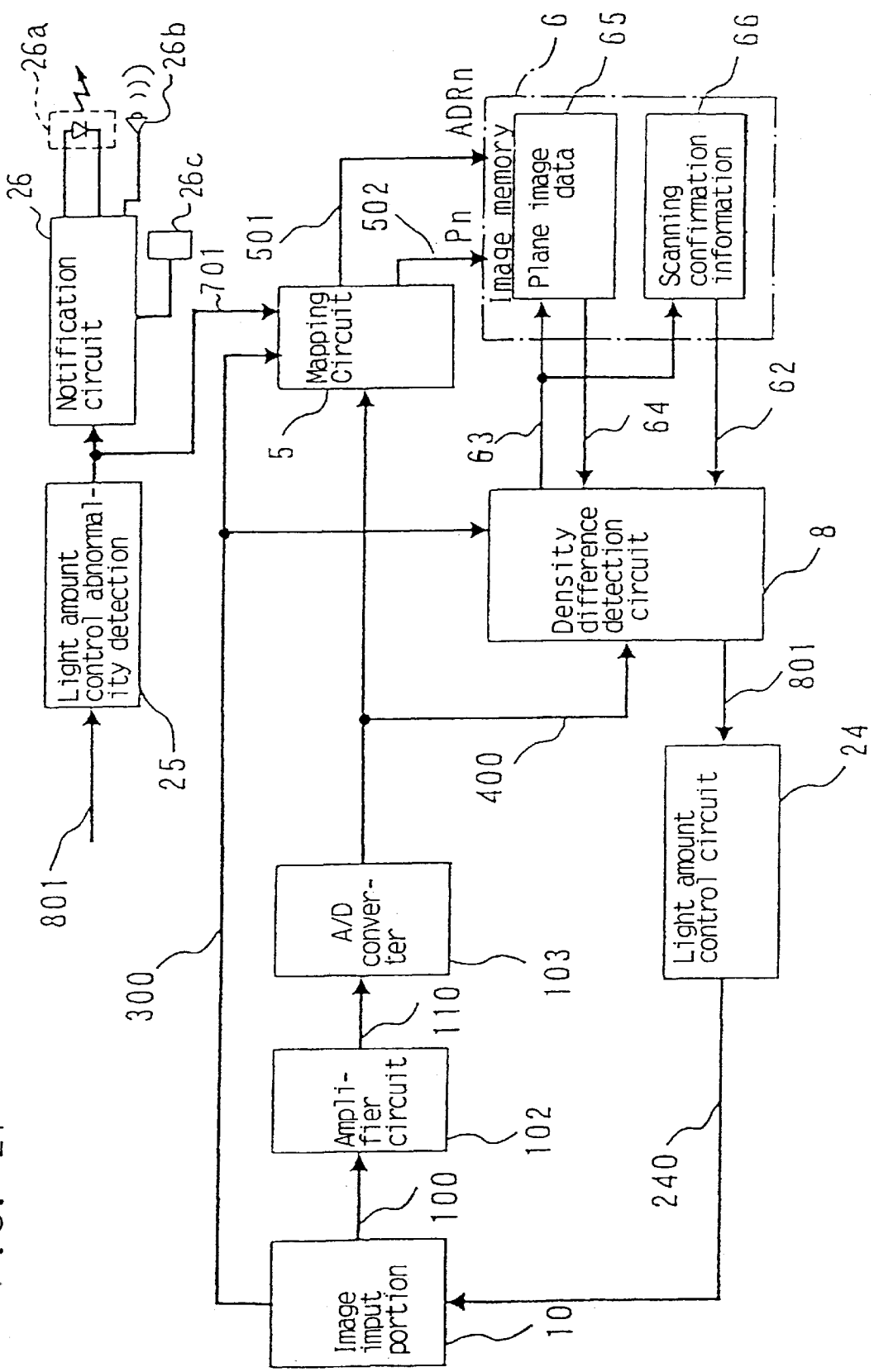
FIG. 21 is a block diagram showing the configuration of the image reading apparatus in accordance with embodiment 9 of the present invention provided with a notification circuit.

The above-mentioned embodiment 9 is configured to inhibit the mapping circuit 5 from storing data in the image memory 6 in accordance with the judgment signal 701 from the light amount control abnormality detection circuit 25. However, in addition to or instead of this configuration wherein data is prohibited to be stored in the image memory 6, it is possible to use a configuration wherein the operator is notified of abnormality by the notification circuit 26 when the judgment signal 701 is "1". FIG. 21 is a block diagram showing the configuration of an embodiment wherein the image processing apparatus shown in FIG. 20 is provided with the notification circuit 26.

In the image processing apparatus having the configuration shown in FIG. 21, the notification circuit 26 notifies the operator of abnormality by using the LED 26*a*. The operator can easily monitor the reading condition by using this notification. Therefore, if any abnormality occurs during input work, the operator can immediately redo the input work. Consequently, it is possible to obtain an image processing apparatus having high work efficiency.

As another embodiment (not shown), it is possible to have a configuration wherein the density correction signal 801 is judged in accordance with a plurality of threshold values by the light amount control abnormality detection circuit 25, and the density difference is indicated by using a plurality of judgment levels obtained from the two states ("0" and "1") of the judgment signal 701 for each threshold value. By changing the number of LEDs 26*a* to be turned on in accordance with the plural judgment levels as described above, the operator can monitor the reading condition securely and accurately. The operator can carry out normal reading operation. By virtue of this kind of simple confirmation mechanism, the operator can perform normal reading operation.

In addition to or instead of the LEDs used as indication means, a sound generating means, such as the buzzer 26b, can also be used to notify the operator of abnormality. By changing the sound tone of the sound generating means in accordance with the above-mentioned plural judgment levels, the operator can monitor the reading condition easily and accurately. In comparison with the embodiment described before wherein LEDs having been turned on are monitored, the present embodiment is effective in that the operator can concentrate on reading operation.

Furthermore, in addition to or instead of the LEDs used as indication means, a vibration means, such as the vibration element 26c, can also be used to notify the operator of abnormality. In this case, by changing the vibration frequency of the vibration means in accordance with plural judgment levels, the operator can monitor the reading condition by bodily sensation. In comparison with the embodiment described before wherein LEDs having been turned on are monitored, the present embodiment is effective in that the operator can concentrate on reading operation.

Embodiment 10

Figure 23:
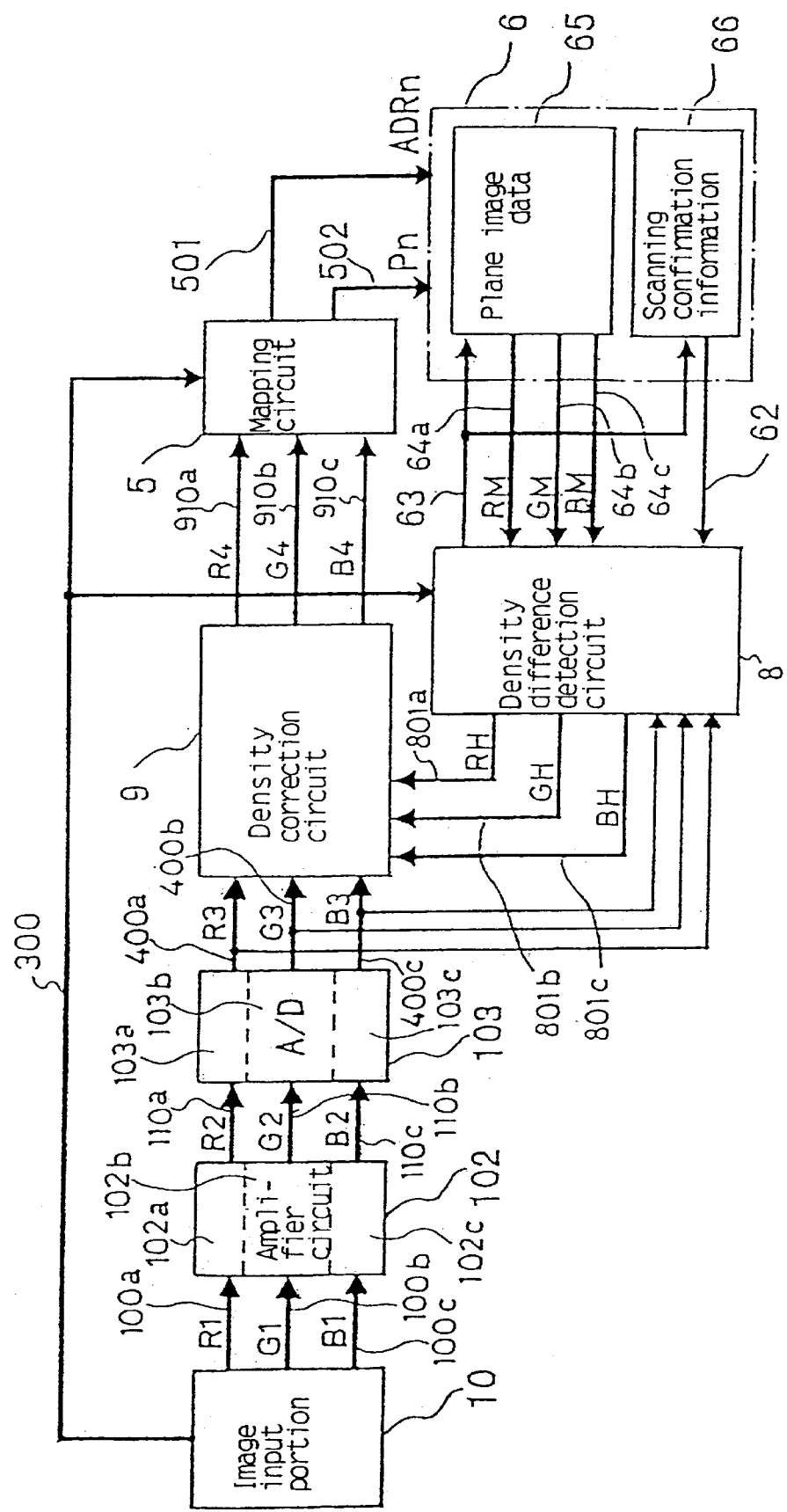
FIG. 23 is a block diagram showing the configuration of an image processing apparatus in accordance with embodiment 10 of the present invention.

FIG. 23 is a block diagram showing the configuration of an image processing apparatus in accordance with embodiment 10 of the present invention. Referring to FIG. 23, an image on an original is manually scanned while being subjected to color separation, and the image input portion 10 sequentially delivers image signals 100a, 100b, 100c to amplifier circuits 102a, 102b, 102c, respectively. By the color separation in the image processing apparatus of embodiment 10, a signal is separated to a red signal (R1), a green signal (G1) and a blue signal (B1). The image signals 100a, 100b, 100c are amplified by the amplifier circuits 102a, 102b, 102c, respectively. Amplified signals 110a, 110b, 110c (digital signals) are sequentially converted from analog signals into digital image data 400a, 400b, 400c by A/D converters 103a, 103b, 103c, respectively.

The image data 400a, 400b, 400c from the A/D converters 103a, 103b, 103c, respectively, are supplied to the density difference detection circuit 8 and the density correction circuit 9.

In the image processing apparatus shown in FIG. 23, the image memory 6 comprises a first memory 65 for storing plane image data and a second memory 66 for storing scanning confirmation information. The image data 400a, 400b, 400c for colors are stored in the first memory 65 by the mapping circuit 5, and become storage data 64a, 64b, 64 for colors, respectively.

By using a scanning flag 62 stored in the second memory 66, the density difference detection circuit 8 detects an area having been overlap-scanned. Next, the density difference detection circuit 8 detects density differences on the basis of the image data 400a, 400b, 400c for colors to be supplied sequentially line by line and the storage data 64a, 64b, 64c for colors having been stored in the first memory 65 during previous scanning. Next, the density difference detection circuit 8 sequentially delivers density correction signals 801a, 801b, 801c for colors to the density correction circuit 9.

The density correction circuit 9 corrects the image data 400a, 400b, 400c for colors in accordance with the correction amounts of the density correction signals 801a, 801b, 801c for colors, and delivers correction data 910a, 910b, 910c for colors to the mapping circuit 5.

The mapping circuit 5 converts the scanning position coordinates 300 from the image input portion 10 into a high-density storage address ADRn (501), and carries out storage at the storage address ADRn in the image memory 6. In addition, the mapping circuit 5 raises the density of the correction data 910a, 910b, 910c for colors from the density correction circuit 9, and stores them as storage data Pn (502) in the image memory 6.

Figure 24:
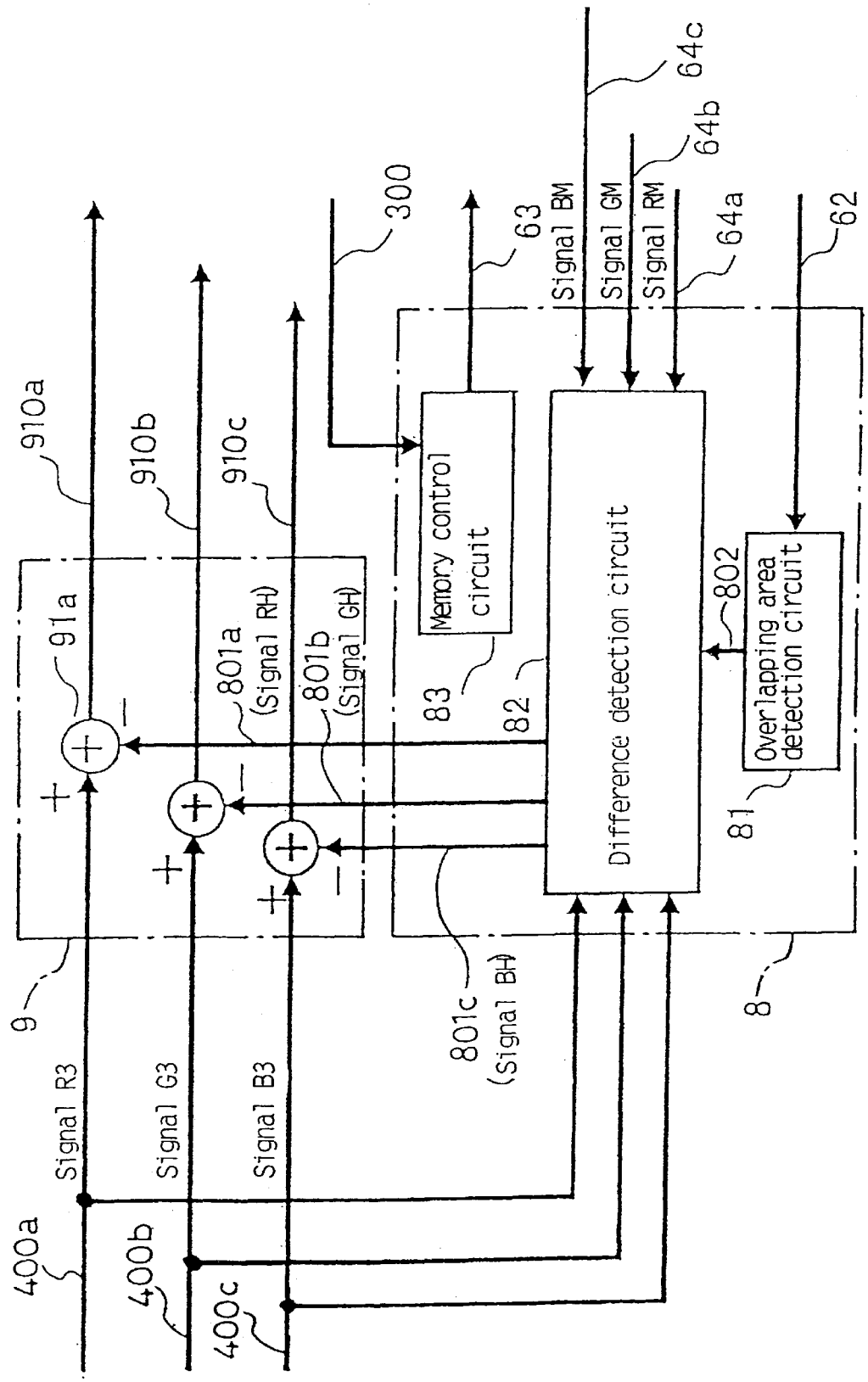
FIG. 24 is a block diagram showing the configurations of a density difference detection circuit and a density correction circuit in accordance with embodiment 10 of the present invention.

Next, the operations of the density difference detection circuit 8 and the density correction circuit 9 will be described below referring to FIGS. 2, 23 and 24 in the case that colors are processed. FIG. 24 is a block diagram showing the density difference detection circuit 8 and the density correction circuit 9 of the image processing apparatus shown in FIG. 23.

Before the line image sensor 1 shown in FIG. 2 starts scanning, all of the data in the image memory 6 are initialized to "0". After this initialization, the scanning position coordinates 300 are delivered to the mapping circuit 5 and the density difference detection circuit 8 at the time of line-by-line scanning by the line image sensor 1 (FIG. 23).

As shown in FIG. 24, the density difference detection circuit 8 is provided with an overlapping area detection circuit 81, a difference detection circuit 82 and a memory control circuit 83.

The memory control circuit 83 generates the detection address 63 of a pixel Pn for 1-line gray level detection, and delivers this detection address 63 to the image memory 6. The difference detection circuit 82 reads storage data 64a, 64b, 64c for colors from the first memory 65 of the image memory 6. At the same time, the overlapping area detection circuit 81 reads a scanning confirmation data 62 corresponding to the storage data 64a, 64b, 64c for colors from the second memory 66.

The overlapping area detection circuit 81 checks the write flag (bit 0) of the image data Pn from the scanning confirmation data 62 to judge whether image data has already been stored at address ADRn of the pixel data Pn. When the write flag (bit 0) of the pixel data Pn is "1", the flag indicates that image data has already been stored at address ADRn by the scanning of the line image sensor 1. It is thus judged that the pixel data Pn is included in the overlapping scanning area. Furthermore, when the write flag (bit 0) of the pixel data Pn is "0", it is judged that the pixel data Pn is included in the new scanning area. The overlapping area detection circuit 81 having made judgment as described above delivers a judgment signal 802 to the difference detection circuit 82. The judgment signal 802 is "0" when the image data Pn is included in the new scanning area, and "1" when the image data Pn is included in the overlapping scanning area.

The difference detection circuit 82 detects the density differences between the storage data 64a, 64b, 64c for colors and the image data 400a, 400b, 400c for colors with respect to pixels having been judged that the judgment signal 802 is "1". Next, the difference detection circuit 82 delivers density correction signals 801a (RH signal), 801b (GH signal), 801c (BH signal) for colors.

For all the image data 400a, 400b, 400c for colors on one line, the density difference detection circuit 8 detects the gray-level differences for only the pixels included in the overlapping scanning area and generates the density correction signals 801a, 801b, 801c for colors.

The gray-level correction circuit 9 carries out difference processes from the density correction signals 801a, 801b, 801c for colors and the image data 400a, 400b, 400c for colors by using adders 91a, 91b, 91c, respectively. The density correction circuit 9 corrects changes in density between the previous scanning and the new scanning, and delivers correction data 910a, 910b, 910c, respectively.

As described above, in the image processing apparatus of embodiment 10, a difference in color shade due to a change in gray level can be eliminated by correcting the image data for colors. As a result, a difference in color shade generated at an image joint portion during reading of a color original can be corrected, whereby a change in color generated at the image joint portion can be eliminated.

In the above-mentioned embodiments 1, 2 and 3, the density correction circuit 9 is configured to correct the differences between the image data 400 and the density correction signal 801. However, instead of this configuration, the circuit 9 may be configured so that mixture processing is carried out while changing the mixture ratio between the density at the previous scanning and the density at the new scanning.

Figure 22:
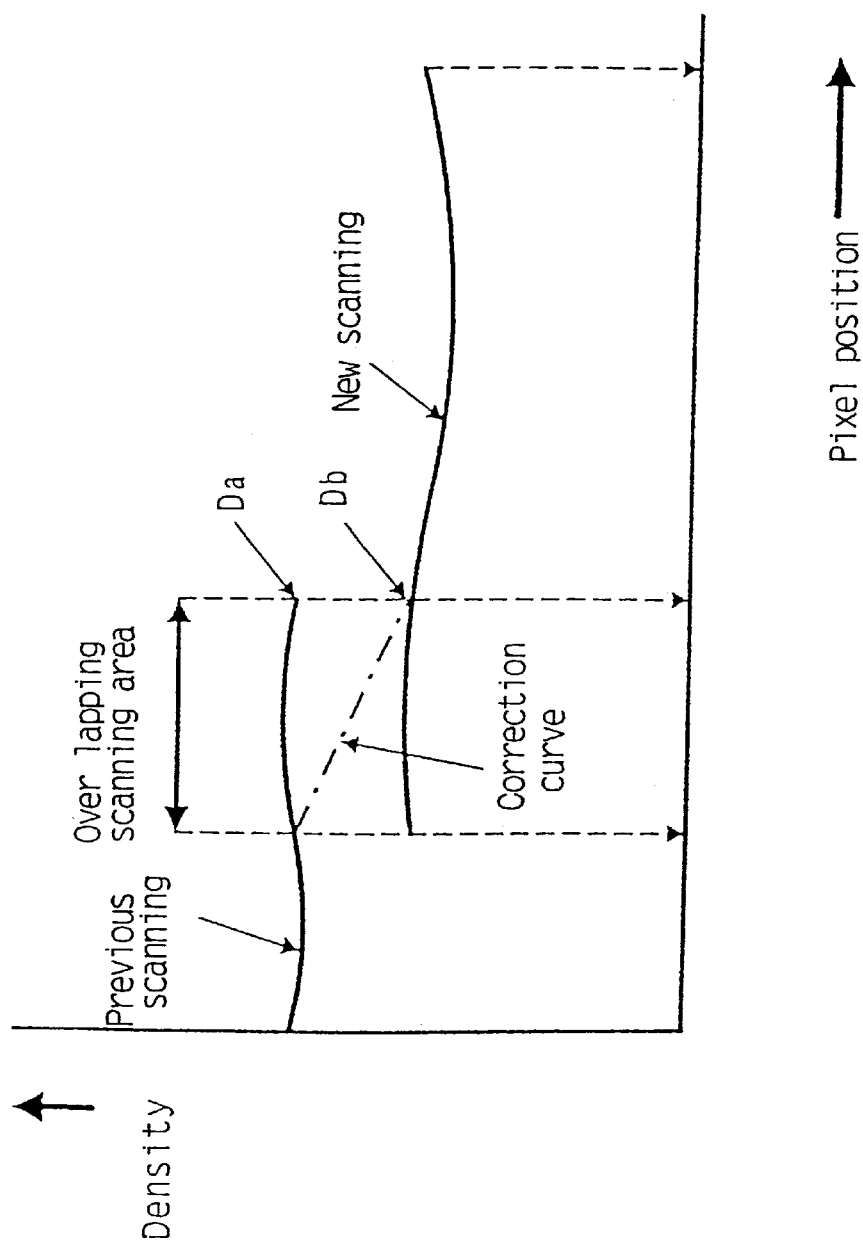
FIG. 22 is a graph illustrating another gray-level correction method in the image processing apparatus of the present invention.

FIG. 22 is a graph showing another density correction method for the image processing apparatus. In this density correction method, mixture processing is carried out by changing the mixture ratio between the density at the previous scanning and the gray levels at the new scanning in the range between points E and G of the overlapping scanning area. In other words, the mixture processing is carried out by smoothly connecting the density at the previous scanning to the gray levels at the new scanning by using a correction curve shown by a chain line shown in FIG. 22. By using this kind of mixture processing, the density differences can be joined smoothly. Even if a new gray-level difference is generated because of a density detection error or the like, the quality of an image at the connection portion thereof can be securely prevented from deteriorating.

Furthermore, although the image sensor 1 is used as a line image sensor in each embodiment described above, an area sensor may be used instead. In this case, a process to be conducted line by line should be replaced with a process to be conducted plane by plane.

Furthermore, although an image on an original is read in each embodiment described above, a camera having a line sensor may be used in the same way. Moreover, a camera and a scanner capable of reading local areas may also be used instead of the 1-line image sensor.

Furthermore, the same process as that carried out in each embodiment described above can be attained by software together with a DSP (digital signal processor), an MPU (microprocessor unit), a personal computer, etc. Drastic cost reduction can be attained by realizing each embodiment described above by using software.

As described above, the image processing apparatus of the present invention is configured to detect the density differences between image data and storage data stored in the image memory in an overlapping scanning area during overlap scanning, to correct the density of the image data on the basis of the density differences, and to store the image data in the image memory. For this reason, it is possible to obtain a composite image having no density difference at the connection portion of an image. Consequently, in accordance with the present invention, it is possible to obtain an image processing apparatus capable of reading gray-scale images having improved image quality.

Furthermore, in accordance with the present invention, the differences between the ground density of image data at the overlapping scanning area and the ground gray levels of storage data stored in the image memory are detected as density differences. As a result, it is possible to accurately detect density joining at the ground density portion for image connection on a text original wherein high accuracy is required.

Furthermore, in accordance with the present invention, the differences between image data and storage data stored in the image memory are detected as density differences. As a result, it is possible to accurately detect density differences at an image connection portion of a photo original wherein high accuracy is required.

Furthermore, in accordance with the present invention, the average of the obtained density differences is used as a correction amount and is added to or subtracted from image data, whereby an effect due to improper detection of density differences can be reduced.

Furthermore, in accordance with the present invention, density differences are detected in units of reading scanning line, whereby hardware can be made smaller, and cost can be reduced. Moreover, since sequential correction processing can be carried out for an input image, the generation of density differences and uneven gray levels is prevented sequentially at the connection portion, whereby a connected composite image can be obtained accurately.

Furthermore, the present invention is configured to judge whether density are abnormal or not by comparing the density differences with a predetermined judgment value, and to control the storage of image data in the image memory so that the image data is prohibited to be stored in the image memory when the density are judged to be abnormal. Therefore, this can prevent image deterioration due to the inclination of the main body of a hand-held scanner caused unintentionally by the operator.

Furthermore, the image processing apparatus of the present invention is configured to set different processing modes depending on the content of an original to be scanned, and to detect the density differences between the image data at the overlapping scanning area and storage data stored in the image memory by using at least two detection processes. Moreover, the image processing apparatus of the present invention is configured to detect density differences being different in accordance with the mode of processing, to correct the gray levels of the image data on the basis of the density differences, and to store the image data having been processed in the designated processing mode in the image memory. Therefore, the image processing apparatus can detect the density difference best suited for each of different images to be scanned, that is, text, photo and the like, whereby the quality of a connected composite image can be improved. Consequently, with the present invention, it is possible to obtain an image processing apparatus capable of reading images having high quality, when images having different characteristics are read to obtain a connected composite gray-scale image.

Furthermore, in accordance with the present invention, the storage position information of image data to be supplied to the image memory is sequentially stored in the scanning information memory so that the storage position information of the scanning information memory can be detected. Therefore, it is possible to securely detect an overlapping scanning area read by overlap scanning.

Furthermore, in accordance with the present invention, the position detection means is configured to detect a scanning position by using two detection means. Therefore, both linear and rotary scanning operations can be carried out to connect and combine gray-scale images.

Furthermore, in accordance with the present invention, the detection means comprises wheels rotating in contact with the surface of an original and encoders delivering pulses in accordance with the rotations of the wheels. Therefore, the present invention has an effect of not requiring any auxiliary devices such as a tablet for detecting image coordinates.

Furthermore, in accordance with the present invention, the encoders are each configured to deliver two types of pulses having different phases. Therefore, it is possible to perform scanning in both forward and backward directions. When gray-scale images are connected and combined, reading can be made by zigzag scanning.

Furthermore, the image processing apparatus of the present invention illuminates the surface of an original, reads reflected light from the original by using the image sensor, generates scanning positions corresponding to image data having been read by the image sensor, and stores the image data in the image memory on the basis of the scanning positions. Moreover, the image processing apparatus of the present invention detects the density differences between the image data and the storage data stored in the image memory at the overlapping scanning area read by overlap scanning, corrects the amount of light of the light source on the basis of the density differences, and stores the image data having been read at the corrected amount of light in the image memory. Therefore, the image reading apparatus of the present invention has an effect of obtaining a composite image having reduced density differences at the connection portion, whereby it is possible to read precise gray-scale images having improved quality.

Furthermore, the present invention is configured to judge that correction is abnormal when the density differences are beyond the correction range of the amount of light by comparing the density differences with a predetermined judgment value, and to control the storage of image data in the image memory. When the correction is judged to be abnormal, image data is prohibited to be stored in the image memory. Therefore, this can prevent image deterioration due to the inclination of the main body of the hand-held scanner caused unintentionally by the operator.

Furthermore, the image reading apparatus of the present invention is configured to read an image on an original, to A/D convert analog data having been read into digital image data in accordance with a reference voltage, to generate scanning positions corresponding to the image data, and to store the image data in the image memory on the basis of the scanning positions. Moreover, the image reading apparatus of the present invention is configured to detect the density differences between the image data and the storage data stored in the image memory at the overlapping scanning area read by overlap scanning, to control the above-mentioned reference voltage on the basis of the density differences, to correct the image data, and to store the image data having been read at the corrected reference voltage in the image memory. Therefore, the image reading apparatus of the present invention can obtain a composite image having no density difference at the connection portion, whereby it is possible to read precise gray-scale images having excellent quality.

Furthermore, the present invention is configured to judge that correction is abnormal when the density differences are beyond the correction range of the reference voltage by comparing the density differences with a predetermined judgment value, and to control the storage of image data in the image memory. When the correction is judged to be abnormal, image data is prohibited to be stored in the image memory. Therefore, this can securely prevent image deterioration due to the inclination of the main body of the hand-held scanner caused unintentionally by the operator.

Furthermore, the image reading apparatus of the present invention is configured to read an image on an original, to amplify analog output having been read, to A/D convert the amplified analog data into digital image data, to generate scanning positions corresponding to the image data, and to store the image data in the image memory on the basis of the scanning positions. Moreover, the image reading apparatus of the present invention is configured to detect the density differences between the image data and the storage data stored in the image memory at the overlapping scanning area read by overlap scanning, and to control the amplitude of the amplifying means on the basis of the density differences. In addition, the apparatus is configured to correct the analog output and to store the image data obtained from the amplitude-controlled analog output in the image memory. Therefore, the image reading apparatus of the present invention can obtain a composite image having reduced density differences at the connection portion, whereby it is possible to read gray-scale images having excellent image quality.

Furthermore, the present invention is configured to judge that correction is abnormal when density differences are beyond the correction range of the amplitude control by comparing the density differences with a predetermined judgment value, and to control the storage of image data in the image memory. When the correction is judged to be abnormal, image data is prohibited to be stored in the image memory. Therefore, this can securely prevent image deterioration due to the inclination of the main body of the hand-held scanner caused unintentionally by the operator.

Furthermore, in the present invention, a difference in color shade due to a change in gray level can be eliminated by correcting image data for colors. As a result, a difference in color shade generated at an image joint portion during reading of a color original can be eliminated, whereby a change in color generated at the image joint portion can be eliminated.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An image processing apparatus comprising:
   an input means for reading image data;
   an image memory which is sequentially supplied with reading position data corresponding to said image data having been read and stores said image data on the basis of said reading position data;
   a density difference detection means for sequentially detecting density differences between said image data and storage data stored in said image memory at an overlapping area read by overlap scanning;
   a density correction means for correcting gray-level values of said image data on the basis of said density differences; and
   a data storage means for performing control to store the corrected image data in said image memory.

2. An image processing apparatus in accordance with claim 1, wherein said density difference detection means detects the differences between the ground density of said image data read out from the image source and the ground density of said storage data stored in said image memory as density differences at an overlapping scanning area read by overlap scanning.

3. An image processing apparatus in accordance with claim 1, wherein said density difference detection means detects density differences between said image data and said storage data stored in said image memory as density differences at an overlapping scanning area read by overlap scanning.

4. An image processing apparatus in accordance with claim 1, wherein said density correction means is configured so that the average of said detected density differences is used as a correction amount and is added to or subtracted from said image data.

5. An image processing apparatus in accordance with claim 1, wherein said density difference detection means is configured to detect density differences in units of reading scanning line.

6. An image processing apparatus in accordance with claim 1, further comprising a first abnormality detection means which judges whether density differences are abnormal or not by comparing said density differences with a predetermined judgment value.

7. An image processing apparatus in accordance with claim 6, wherein said data storage means is configured to control the storage of said image data in said image memory so that when said first abnormality detection means judges that density differences are abnormal, said image data is prohibited to be stored in said image memory.

8. An image processing apparatus in accordance with claim 6, having a means for notifying an operator of abnormality when said first abnormality detection means judges that density differences are abnormal.

9. An image processing apparatus comprising:
   an input means for reading image data;
   an image memory which is sequentially supplied with said image data having been read and reading position data corresponding to said image data and stores said image data on the basis of said reading position data;
   a setting means for setting different processing modes depending on the content of said image data having been read;
   an overlapping scanning area detection means for detecting an overlapping area read by overlap scanning;
   a density difference detection means for sequentially detecting density differences between said image data and storage data stored in said image memory at an overlapping scanning area by using at least two detection processes and for detecting density differences being different depending on the processing mode having been set;
   a density value correction means for correcting gray-level values of said image data on the basis of said detected density differences; and
   a data storage means for storing said image data corrected in a designated processing mode in said image memory.

10. An image processing apparatus in accordance with claim 1 or 6, further comprising a scanning area storing means for sequentially storing the storage position information of said image data to be supplied to said image memory in a scanning information memory, and an overlapping area detection means for detecting an overlapping scanning area read by overlap scanning by detecting said storage position information in said scanning information memory.

11. An image processing apparatus in accordance with claim 6 or 9, wherein said reading position data is detected by two position detection means.

12. An image processing apparatus in accordance with 6 or 9, having a position detection means comprising wheels rotating in contact with the surface of an original and encoders delivering pulses in accordance with the rotations of said wheels.

13. An image processing apparatus in accordance with claim 1, 6 or 9, having a position detection means comprising an encoder delivering two types of pulses having different phases.

14. An image reading apparatus comprising:
   a light source for illuminating the surface of an original;
   an image sensor for reading reflected light from said original;
   a position detection means for generating reading position data corresponding to image data having been read by said image sensor;
   a density difference detection means for detecting density differences between said image data and the storage data stored in said image memory at an overlapping scanning area read by overlap scanning;
   a light amount correction means for correcting the amount of light of said light source on the basis of the detected density differences; and
   a data storage means for storing said image data in said image memory on the basis of said generated reading position data, and for storing said image data having been read at the corrected amount of light in said image memory on the basis of said reading position data.

15. An image reading apparatus in accordance with claim 14, further comprising a second abnormality detection means for judging that correction is abnormal when said density differences are beyond the correction range of the amount of light by comparing said density differences with a predetermined judgment value.

16. An image reading apparatus in accordance with claim 15, wherein said data storage means is configured to control the storage of said image data in said image memory so that said image data is prohibited to be stored in said image memory when said second abnormality detection means judges that the correction is abnormal.

17. An image reading apparatus in accordance with claim 15, having a means for notifying the operator of abnormality when said second abnormality detection means judges that the correction is abnormal.

18. An image reading apparatus comprising:
   an image sensor for reading an image on an original;
   an A/D conversion means for converting analog data having been read by said image sensor into digital image data in accordance with a reference voltage;
   a position detection means for generating reading position data corresponding to said image data;
   a density difference detection means for detecting the density differences between said image data and the storage data stored in said image memory at an overlapping scanning area read by overlap scanning;
   a reference voltage correction means for correcting said image data by controlling said reference voltage on the basis of said detected density differences;
   a data storage means for storing said image data in said image memory on the basis of said reading position data, and for storing said image data having been read at the corrected reference voltage in said image memory on the basis of said reading position data.

19. An image reading apparatus in accordance with claim 18, further comprising a third abnormality detection means for judging that correction is abnormal when said density differences are beyond the correction range of said reference voltage by comparing said density differences with a predetermined judgment value.

20. An image reading apparatus in accordance with claim 19, wherein said data storage means is configured to control the storage of said image data in said image memory so that said image data is prohibited to be stored in said image memory when a third abnormality detection means judges that the correction is abnormal.

21. An image reading apparatus in accordance with claim 19, having a means for notifying the operator of abnormality when said third abnormality detection means judges that the correction is abnormal.

22. An image reading apparatus comprising:
an image sensor for reading an image on an original;
an amplifier means for amplifying analog output having been read by said image sensor;
an A/D conversion means for converting the amplified analog output into digital image data;
a position detection means for generating reading position data corresponding to said image data;
a density difference detection means for detecting the density differences between said image data and the storage data stored in said image memory at an overlapping scanning area read by overlap scanning;
an amplitude control means for controlling the amplitude or offset voltage of said amplifier means on the basis of the detected density differences to correct said analog output;
a data storage means for storing said image data in said image memory on the basis of said reading position data, and storing said image data obtained from the amplitude-controlled analog output in said image memory on the basis of said reading position data.

23. An image reading apparatus in accordance with claim 22, further comprising a fourth abnormality detection means for judging that correction is abnormal when said density differences are beyond the correction range of the amplitude control by comparing said density differences with a predetermined judgment value, and a memory control means for controlling the storage of said image data in said image memory.

24. An image reading apparatus in accordance with claim 14, 18 or 22, further comprising a scanning area storing means for sequentially storing said storage position information of said image data to be supplied to said image memory in a scanning information memory, and an overlapping area detection means for detecting an overlapping scanning area read by overlap scanning by detecting the storage position information of said scanning information memory.

25. An image reading apparatus in accordance with claim 14, 18 or 22, said scanning position data is detected by two position detection means.

26. An image reading apparatus in accordance with 14, 18 or 22, comprising wheels rotating in contact with the surface of an original and encoders delivering pulses in accordance with the rotations of said wheels.

27. An image reading apparatus in accordance with 14, 18 or 22, wherein said position detection means has an encoder delivering two types of pulses having different phases.

28. An image reading apparatus in accordance with claim 23, wherein said memory control means is configured to prohibit the storage of said image data in said image memory when a fourth abnormality detection means judges that the correction is abnormal.

29. An image reading apparatus in accordance with claim 23, having a means for notifying the operator of abnormality when said fourth abnormality detection means judges that the correction is abnormal.

30. An image processing apparatus comprising:
an input means, driven by manual operation, for reading image data;
an image memory for storing said image data having been read by said input means;
a gray-level difference detection means for sequentially detecting gray-level differences between said image data supplied sequentially and the storage data stored in said image memory at an overlapping area read by overlap scanning;
a density correction means for correcting gray-level values of said image data on the basis of said detected gray-level differences and correcting sequentially changing gray-level values to reduce said gray-level differences at said overlapping area; and
a data storage means for storing the corrected image data in said image memory.

31. An image processing apparatus comprising:
an input means, driven by manual operation, for separating an image into a plurality of colors and reading said image;
an image memory for storing said image data for colors having been read by said input means;
a color gray-level difference detection means for sequentially detecting color gray-level differences between said image data for colors supplied sequentially and the storage data for colors stored in said image memory at an overlapping area read by overlap scanning;
a color gray-level correction means for correcting color gray-level values of said image data for colors on the basis of said detected color gray-level differences and for correcting sequentially changing color gray-level values to reduce the color differences at said overlapping area; and
a color data storage means for storing the corrected image data for colors in said image memory.

32. An image processing apparatus in accordance with claim 31, wherein said image data is data for red, green and blue.

33. An image processing method comprising:
a step of reading image data by using an input means driven by manual operation;
a step of sequentially supplying reading position data corresponding to said image data having been read;
a step of storing said image data in an image memory on the basis of said reading position data;
a step of sequentially detecting gray-level differences between said image data having been read and the storage data stored in said image memory at an overlapping area read by overlap scanning;
a step of correcting gray-level values of said image data on the basis of the detected gray-level differences; and
a step of storing the corrected image data in said image memory on the basis of said reading position data.

34. An image processing method comprising:
a step of reading image data by using an input means driven by manual operation;
a step of storing said image data having been read in an image memory;
a step of sequentially detecting gray-level differences between said image data supplied sequentially and the storage data stored in said image memory at an overlapping area read by overlap scanning;

a step of correcting the density values of said image data on the basis of the detected gray-level differences, and correcting the sequentially changing gray-level values in order to reduce said gray-level differences at said overlapping area; and a step of storing the corrected image data in said image memory.

35. An image processing method comprising:

a step of separating an image in a plurality of colors and reading said image by using an input means driven by manual operation;

a step of storing image data for colors having been read in an image memory;

a step of sequentially detecting gray-level differences between said image data for colors supplied sequentially and the storage data for colors stored in said image memory at an overlapping area read by overlap scanning;

a step of correcting color gray-level values of said image data for colors on the basis of the detected gray-level differences, and correcting the sequentially changing color gray-level values in order to reduce said color differences at said overlapping area; and a step of storing the corrected image data for colors in said image memory.

36. An image processing apparatus in accordance with claim 35, wherein said image data for colors is data for red, green and blue.

37. An image processing method comprising:

a step of reading image data by using an input means;

a step of storing said image data having been read in an image memory on the basis of reading position data corresponding to said image data;

a step of setting a different processing mode depending on said image data having been read;

a step of detecting an overlapping area read by overlap scanning and of detecting gray-level differences between said image data and the storage data stored in said image memory at said overlapping area by using at least two detection processes;

a step of detecting different gray-level differences depending on said processing mode having been set;

a step of correcting gray-level values of said image data on the basis of said detected gray-level differences depending on said process mode having been set; and a step of storing the corrected image data in said image memory.

* * * * *